US008878844B2

(12) United States Patent
Kaule et al.

(10) Patent No.: US 8,878,844 B2
(45) **Date of Patent: *Nov. 4, 2014**

(54) REPRESENTATION SYSTEM

(75) Inventors: Wittich Kaule, Emmering (DE); Michael Rahm, Hemau (DE); Wolfgang Rauscher, Munich (DE)

(73) Assignee: Giesecke & Devrient GmbH, Munich (DE)

( * ) Notice: Subject to any disclaimer, the term of this patent is extended or adjusted under 35 U.S.C. 154(b) by 707 days.

This patent is subject to a terminal disclaimer.

(21) Appl. No.: 12/665,843

(22) PCT Filed: Jun. 25, 2008

(86) PCT No.: PCT/EP2008/005171

§ 371 (c)(1), (2), (4) Date: Dec. 21, 2009

(87) PCT Pub. No.: WO2009/000527

PCT Pub. Date: Dec. 31, 2008

(65) Prior Publication Data

US 2010/0177094 A1 Jul. 15, 2010

(30) Foreign Application Priority Data

Jun. 25, 2007 (DE) ........................ 10 2007 029 204

(51) Int. Cl.

| | |
|---|---|
| ***G06T 17/00*** | (2006.01) |
| ***G09G 5/00*** | (2006.01) |
| ***B42D 25/00*** | (2014.01) |
| ***B42D 15/00*** | (2006.01) |
| ***B44F 7/00*** | (2006.01) |
| ***B44F 1/10*** | (2006.01) |

(52) U.S. Cl.

CPC .............. *B42D 15/002* (2013.01); *B42D 15/10* (2013.01); *B44F 7/00* (2013.01); *B44F 1/10* (2013.01); *B42D 2035/20* (2013.01); *B42D 2035/28* (2013.01)

USPC .......................................... 345/420; 345/581

(58) Field of Classification Search

CPC combination set(s) only.
See application file for complete search history.

(56) References Cited

U.S. PATENT DOCUMENTS

| | | | |
|---|---|---|---|
| 1,475,430 | A | 11/1923 | Curwen |
| 5,712,731 | A | 1/1998 | Drinkwater et al. |

(Continued)

FOREIGN PATENT DOCUMENTS

| | | | |
|---|---|---|---|
| DE | 3602563 | C1 | 4/1987 |
| DE | 19949542 | A1 | 4/2001 |

(Continued)

OTHER PUBLICATIONS

Durand F., Photography—Reversible Prints, Integral Photographs, (English translation of article by Lippman), Academy of the Sciences, Mar. 2, 1908 session, 4 pages.

(Continued)

*Primary Examiner* — Kee M Tung
*Assistant Examiner* — Leon T Cain, II
(74) *Attorney, Agent, or Firm* — Lathrop & Gage LLP

(57) ABSTRACT

The present invention relates to a depiction arrangement for security papers, value documents, electronic display devices or other data carriers, having a raster image arrangement for depicting a specified three-dimensional solid (30) that is given by a solid function f(x,y,z), having a motif image that is subdivided into a plurality of cells (24), in each of which are arranged imaged regions of the specified solid (30), a viewing grid (22) composed of a plurality of viewing elements for depicting the specified solid (30) when the motif image is viewed with the aid of the viewing grid (22), the motif image exhibiting, with its subdivision into a plurality of cells (24), an image function m(x,y).

46 Claims, 4 Drawing Sheets

(56) References Cited

U.S. PATENT DOCUMENTS

Figure 1:
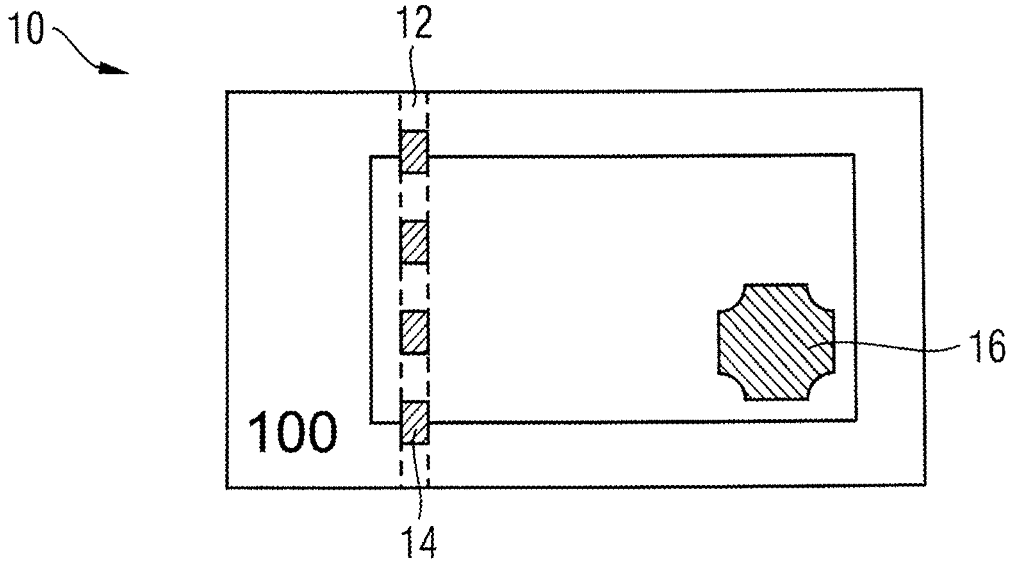

| | | | |
|---|---|---|---|
| 5,723,200 | A | 3/1998 | Oshima et al. |
| 5,772,250 | A | 6/1998 | Gasper |
| 6,288,842 | B1 | 9/2001 | Florczak et al. |
| 6,329,040 | B1 | 12/2001 | Oshima et al. |
| 6,483,644 | B1 | 11/2002 | Gottfried et al. |
| 7,667,894 | B2 | 2/2010 | Hoffmuller |
| 7,728,931 | B2 | 6/2010 | Hoffmuller |
| 7,808,605 | B2 | 10/2010 | Hoffmuller |
| 7,986,459 | B2 | 7/2011 | Kaule |
| 8,083,894 | B2 | 12/2011 | Gruszczynski |
| 8,149,511 | B2 | 4/2012 | Kaule |
| 2006/0003295 | A1 | 1/2006 | Hersch et al. |
| 2006/0256435 | A1 | 11/2006 | Relke |
| 2007/0165182 | A1 | 7/2007 | Hoffmuller |
| 2007/0177131 | A1 | 8/2007 | Hansen |
| 2007/0211238 | A1 | 9/2007 | Hoffmuller |
| 2007/0216518 | A1 | 9/2007 | Hoffmuller |
| 2007/0229263 | A1 | 10/2007 | Staub et al. |
| 2007/0229928 | A1 | 10/2007 | Hoffmuller |
| 2007/0241553 | A1 | 10/2007 | Heim |
| 2007/0246933 | A1 | 10/2007 | Heim |
| 2007/0274559 | A1 | 11/2007 | Depta |
| 2008/0014378 | A1 | 1/2008 | Hoffmuller |
| 2008/0037131 | A1 | 2/2008 | Steenblik et al. |
| 2008/0054621 | A1 | 3/2008 | Burchard |
| 2008/0079257 | A1 | 4/2008 | Fessl |
| 2008/0088859 | A1 | 4/2008 | Depta |
| 2008/0160226 | A1 | 7/2008 | Kaule et al. |
| 2008/0163994 | A1 | 7/2008 | Hoppe |
| 2008/0182084 | A1 | 7/2008 | Tompkin et al. |
| 2008/0198468 | A1 | 8/2008 | Kaule |
| 2008/0216976 | A1 | 9/2008 | Ruck |
| 2008/0250954 | A1 | 10/2008 | Depta |
| 2008/0258456 | A1 | 10/2008 | Rahm |
| 2008/0259416 | A1 | 10/2008 | Peters et al. |
| 2009/0001709 | A1 | 1/2009 | Kretschmar |
| 2009/0008923 | A1 | 1/2009 | Kaule et al. |
| 2009/0008926 | A1 | 1/2009 | Depta |
| 2009/0102605 | A1 | 4/2009 | Kaule |
| 2009/0115185 | A1 | 5/2009 | Hoffmuller |
| 2009/0218397 | A1 | 9/2009 | Wild et al. |
| 2009/0236061 | A1 | 9/2009 | Gruszczynski |
| 2009/0290221 | A1 | 11/2009 | Hansen et al. |
| 2009/0297805 | A1 | 12/2009 | Dichtl |
| 2009/0322071 | A1 | 12/2009 | Dichtl |
| 2010/0175843 | A1 | 7/2010 | Gregarek |
| 2010/0177094 | A1 | 7/2010 | Kaule |
| 2010/0182221 | A1 | 7/2010 | Kaule et al. |
| 2010/0194091 | A1 | 8/2010 | Heim |
| 2010/0194532 | A1 | 8/2010 | Kaule et al. |
| 2010/0196587 | A1 | 8/2010 | Keller |
| 2010/0207376 | A1 | 8/2010 | Heim |
| 2010/0208036 | A1 | 8/2010 | Kaule |
| 2010/0307705 | A1 | 12/2010 | Rahm |
| 2010/0308570 | A1 | 12/2010 | Heim |
| 2010/0320742 | A1 | 12/2010 | Hoffmuller |
| 2011/0000737 | A1 | 1/2011 | Nagase et al. |
| 2011/0012337 | A1 | 1/2011 | Heim |
| 2011/0027538 | A1 | 2/2011 | Hoffmann |
| 2011/0045248 | A1 | 2/2011 | Hoffmuller et al. |
| 2011/0069360 | A1 | 3/2011 | Dichtl |
| 2011/0079997 | A1 | 4/2011 | Heim |
| 2011/0091665 | A1 | 4/2011 | Heim |
| 2011/0095518 | A1 | 4/2011 | Hoffmuller |
| 2011/0101670 | A1 | 5/2011 | Heim |
| 2011/0109078 | A1 | 5/2011 | Hoffmuller |
| 2011/0114733 | A1 | 5/2011 | Heim |
| 2011/0157183 | A1 | 6/2011 | Kaule |
| 2012/0126525 | A1 | 5/2012 | Dorfler |
| 2012/0168515 | A1 | 7/2012 | Schutzmann |
| 2012/0170124 | A1 | 7/2012 | Fuhse |

FOREIGN PATENT DOCUMENTS

| | | | |
|---|---|---|---|
| DE | 102004007379 | B3 | 9/2005 |
| DE | 102004031879 | A1 | 1/2006 |
| DE | 102004059798 | A1 | 6/2006 |
| DE | 102005028162 | A1 | 12/2006 |
| DE | 102005052562 | A1 | 5/2007 |
| DE | 102005062132 | A1 | 7/2007 |
| DE | 102006006501 | A1 | 8/2007 |
| DE | 102006029536 | A1 | 12/2007 |
| DE | 102006029850 | A1 | 1/2008 |
| DE | 102007029203 | A1 | 1/2009 |
| DE | 102007062089 | A1 | 7/2009 |
| EP | 0064067 | A1 | 11/1982 |
| EP | 0238043 | A2 | 9/1987 |
| EP | 0330733 | A1 | 9/1989 |
| EP | 1554700 | B1 | 1/2007 |
| EP | 1953002 | A2 | 1/2008 |
| GB | 2362493 | A | 11/2001 |
| JP | 10035083 | A | 2/1998 |
| JP | 2001 055000 | A | 2/2001 |
| JP | 2003 039583 | A | 3/2003 |
| JP | 2003 120500 | A | 4/2003 |
| WO | WO 94/27254 | A1 | 11/1994 |
| WO | WO 99/13157 | A1 | 3/1999 |
| WO | WO 03/005075 | A1 | 1/2003 |
| WO | WO 2005/052650 | A2 | 6/2005 |
| WO | WO 2005/106601 | A2 | 11/2005 |
| WO | WO 2005105473 | | 11/2005 |
| WO | WO 2005105474 | | 11/2005 |
| WO | WO 2005105475 | | 11/2005 |
| WO | WO 2005108106 | | 11/2005 |
| WO | WO 2005108108 | | 11/2005 |
| WO | WO 2005108110 | | 11/2005 |
| WO | WO 2006005434 | | 1/2006 |
| WO | WO 2006015733 | | 2/2006 |
| WO | WO 2006018171 | | 2/2006 |
| WO | WO 2006018172 | | 2/2006 |
| WO | WO 2006/029745 | A1 | 3/2006 |
| WO | WO 2006040069 | | 4/2006 |
| WO | WO 2006056342 | | 6/2006 |
| WO | WO 2006072380 | | 7/2006 |
| WO | WO 2006/087138 | A1 | 8/2006 |
| WO | WO 2006087138 | | 8/2006 |
| WO | WO 2006099971 | | 9/2006 |
| WO | WO 2006119896 | | 11/2006 |
| WO | WO 2006128607 | | 12/2006 |
| WO | WO 2007/007793 | A1 | 1/2007 |
| WO | WO 2007006445 | | 1/2007 |
| WO | WO 2007006455 | | 1/2007 |
| WO | WO 2007/030530 | A2 | 3/2007 |
| WO | WO 2007/076952 | A2 | 7/2007 |
| WO | WO 2007076952 | | 7/2007 |
| WO | WO 2007079851 | | 7/2007 |
| WO | WO 2007/087984 | A1 | 8/2007 |
| WO | WO 2007115648 | | 10/2007 |
| WO | WO 2007/131765 | A2 | 11/2007 |
| WO | WO 2008/000350 | | 1/2008 |
| WO | WO 2008/000350 | A1 | 1/2008 |
| WO | WO 2008/000351 | | 1/2008 |
| WO | WO 2008/000351 | A2 | 1/2008 |
| WO | WO 2008/049533 | | 5/2008 |
| WO | WO 2008/061636 | | 5/2008 |
| WO | WO 2008/071325 | | 6/2008 |
| WO | WO 2009/000527 | | 12/2008 |
| WO | WO 2009/000528 | | 12/2008 |
| WO | WO 2009/000528 | A1 | 12/2008 |
| WO | WO 2009/000529 | | 12/2008 |
| WO | WO 2009/000529 | A2 | 12/2008 |
| WO | WO 2009/000530 | | 12/2008 |
| WO | WO 2009/012893 | | 1/2009 |
| WO | WO 2009/024265 | | 2/2009 |
| WO | WO 2009/080262 | | 7/2009 |
| WO | WO 2009/080263 | | 7/2009 |
| WO | WO 2009/083146 | | 7/2009 |
| WO | WO 2009/083151 | | 7/2009 |
| WO | WO 2009/100831 | | 8/2009 |
| WO | WO 2009/100869 | | 8/2009 |
| WO | WO 2009/109291 | | 9/2009 |

(56) References Cited

FOREIGN PATENT DOCUMENTS

| | | |
|---|---|---|
| WO | WO 2009/121578 | 10/2009 |
| WO | WO 2009/149831 | 12/2009 |
| WO | WO 2009/149833 | 12/2009 |
| WO | WO 2009/156079 | 12/2009 |
| WO | WO 2010/000470 | 1/2010 |
| WO | WO 2010/003646 | 1/2010 |
| WO | WO 2010/028739 | 3/2010 |
| WO | WO 2011/012281 | 2/2011 |
| WO | WO 2011/032665 | 3/2011 |
| WO | WO 2011/032671 | 3/2011 |

OTHER PUBLICATIONS

German Search Report, German Patent Application No. DE 102007029204, Aug. 21, 2007, 4 pages.
German Search Report, German Patent Application No. DE 102007029203, Aug. 23, 2007, 4 pages.
Hutley M.C. et al., The moiré magnifier, Pure Appl. Opt. 3:133-142, 1994.
Kamal H. et al., Properties of moiré magnifiers, Optical Engineering 37(11):3007-3014, Nov. 1998.
Lippmann M. G., Epreuves reversibles—Photographies integrales, Comptes Rendues Acad. Sci. Paris 146:446-451, 1908 (in French).
International Search Report, International Application No. PCT/EP2008/005173, Dec. 15, 2008, 3 pages.
International Preliminary Report on Patentability, International Application No. PCT/EP2008/005173, Corrected Version, English Translation, Mar. 22, 2010, 6 pages.
International Search Report, International Application No. PCT/EP2008/005172, Nov. 21, 2008, 2 pages.
International Preliminary Report on Patentability, International Application No. PCT/EP2008/005172, English Translation, Apr. 1, 2010, 5 pages.
International Search Report, International Application No. PCT/EP2008/005174, Feb. 16, 2009, 3 pages.
International Preliminary Report on Patentability, International Application No. PCT/EP2008/005174, English Translation, Mar. 1, 2010, 7 pages.
International Search Report, International Application No. PCT/EP2008/005171, Nov. 21, 2008, 2 pages.
International Preliminary Report on Patentability, International Application No. PCT/EP2008/005171, English Translation, Mar. 29, 2010, 4 pages.
International Search Report, International Application No. PCT/EP2009/004326, Oct. 19, 2009, 3 pages.
International Preliminary Report on Patentability, International Application No. PCT/EP2009/004326, English Translation, Mar. 22, 2011, 5 pages.
International Search Report, International Application No. PCT/EP2009/005987, Jan. 27, 2010, 3 pages.
International Preliminary Report on Patentability, International Application No. PCT/EP2009/005987, English Translation, May 4, 2011, 5 pages.
Rahm, Michael, Modulo mapping—Novel Method to Arrange Microstructures for Moiré Magnifier Type Security Features, Abstract, Session 5: Optically Variable Security I, Jan. 22, 2010, Optical Document Security II, The 2010 Conference on Optical Security and Counterfeit Deterrence, Jan. 20-22, 2010, San Francisco, p. 1-5.
Rauscher W. et al., Novel method to arrange microstructures for moiré magnifier type security features, Optical Document Security II, San Francisco, Jan. 20-22, 2010, pp. 1-11.
Lippmann M. G., Epreuves reversibles—Reversible Prints, Integral Photographs, Academy of the Sciences, Mar. 2, 1908 session, English translation by Fredo Durand, 4 pages.
Dunn et al. (2004), "Three-Dimensional Virtual Images for Security Applications," Optical Security and Counterfeit Deterrence Techniques, SPIE vol. 5310, pp. 328-336.
Muke (2004), "Embossing of Optical Document Security Devices," Optical Security and Counterfeit Deterrence Techniques, SPIE vol. 5310, pp. 341-349.
Statement of Grounds and Particulars dated Jan. 2, 2014, filed by a third party in relation to Australian Patent Application No. 2008267366.
van Renesse, Ed. (1998), "Optical Document Security", 2nd Ed, Three-Dimensional Tilt Images, Artech House, pp. 207-210.
van Renesse, Ed. (2005), "Optical Document Security", 3rd Ed, Scrambled Images, Artech House, pp. 161-166.
First Declaration of David Matthew Temple dated Apr. 1, 2014, and Exhibits "MDT-1", "MDT-2", and "MDT-3" in the matter of Australian Patent Application No. 2008267366 and opposition thereto by a third party.
Second Declaration of David Matthew Temple dated Jun. 1, 2014, in the matter of Australian Patent Application No. 2008267366 and opposition thereto by a third party.
Declaration of Bruce Alfred Hardwick dated Apr. 1, 2014, and Exhibits "BAH-1"- "BAH-12" in the matter of Australian Patent Application No. 2008267366 and opposition thereto by a third party.
Roberts (2010), "History of Lenticular and Related Autostereoscopic Methods"; from website http://www.outeraspect.com/history_lenticular.php.

REPRESENTATION SYSTEM

CROSS-REFERENCE TO RELATED APPLICATIONS

This application is the U. S. National Stage of International Application No. PCT/EP2008/005171, filed Jun. 25, 2008, which claims the benefit of German Patent Application DE 10 2007 029 204.1, filed Jun. 25, 2007; both of which are hereby incorporated by reference to the extent not inconsistent with the disclosure herewith.

The present invention relates to a depiction arrangement for security papers, value documents, electronic display devices or other data carriers for depicting one or more specified three-dimensional solid(s).

For protection, data carriers, such as value or identification documents, but also other valuable articles, such as branded articles, are often provided with security elements that permit the authenticity of the data carrier to be verified, and that simultaneously serve as protection against unauthorized reproduction. Data carriers within the meaning of the present invention include especially banknotes, stocks, bonds, certificates, vouchers, checks, valuable admission tickets and other papers that are at risk of counterfeiting, such as passports and other identity documents, credit cards, health cards, as well as product protection elements, such as labels, seals, packaging and the like. In the following, the term "data carrier" encompasses all such articles, documents and product protection means.

The security elements can be developed, for example, in the form of a security thread embedded in a banknote, a tear strip for product packaging, an applied security strip, a cover foil for a banknote having a through opening, or a self-supporting transfer element, such as a patch or a label that, after its manufacture, is applied to a value document.

Here, security elements having optically variable elements that, at different viewing angles, convey to the viewer a different image impression play a special role, since these cannot be reproduced even with top-quality color copiers. For this, the security elements can be furnished with security features in the form of diffraction-optically effective micro- or nanopatterns, such as with conventional embossed holograms or other hologram-like diffraction patterns, as are described, for example, in publications EP 0 330 733 A1 and EP 0 064 067 A1.

From publication U.S. Pat. No. 5,712,731 A is known the use of a moiré magnification arrangement as a security feature. The security device described there exhibits a regular arrangement of substantially identical printed microimages having a size up to 250 μm, and a regular two-dimensional arrangement of substantially identical spherical microlenses. Here, the microlens arrangement exhibits substantially the same division as the microimage arrangement. If the microimage arrangement is viewed through the microlens arrangement, then one or more magnified versions of the microimages are produced for the viewer in the regions in which the two arrangements are substantially in register.

The fundamental operating principle of such moiré magnification arrangements is described in the article "The moiré magnifier," M. C. Hutley, R. Hunt, R. F. Stevens and P. Savander, Pure Appl. Opt. 3 (1994), pp. 133-142. In short, according to this article, moiré magnification refers to a phenomenon that occurs when a grid comprised of identical image objects is viewed through a lens grid having approximately the same grid dimension. As with every pair of similar grids, a moiré pattern results that, in this case, appears as a magnified and, if applicable, rotated image of the repeated elements of the image grid.

Based on that, it is the object of the present invention to avoid the disadvantages of the background art and especially to specify a generic depiction arrangement that offers great freedom in the design of the motif images to be viewed.

This object is solved by the depiction arrangement having the features of the independent claims. A security paper and a data carrier having such depiction arrangements are specified in the coordinated claims. Developments of the present invention are the subject of the dependent claims.

According to a first aspect of the present invention, a generic depiction arrangement includes a raster image arrangement for depicting a specified three-dimensional solid that is given by a solid function f(x,y,z), having

- a motif image that is subdivided into a plurality of cells, in each of which are arranged pictured regions of the specified solid,
- a viewing grid composed of a plurality of viewing elements for depicting the specified solid when the motif image is viewed with the aid of the viewing grid,
- the motif image exhibiting, with its subdivision into a plurality of cells, an image function m(x,y) that is given by $$m(x, y) = f\begin{pmatrix} x_K \\ y_K \\ z_K(x, y, x_m, y_m) \end{pmatrix} \cdot g(x, y),$$

where $$\begin{pmatrix} x_K \\ y_K \end{pmatrix} = \begin{pmatrix} x \\ y \end{pmatrix} + V(x, y, x_m, y_m) \cdot \left( \left( \left( \begin{pmatrix} x \\ y \end{pmatrix} + w_d(x, y) \right) \bmod W \right) - w_d(x, y) - w_c(x, y) \right)$$

$$w_d(x, y) = W \cdot \begin{pmatrix} d_1(x, y) \\ d_2(x, y) \end{pmatrix} \text{ and } w_c(x, y) = W \cdot \begin{pmatrix} c_1(x, y) \\ c_2(x, y) \end{pmatrix},$$

wherein

- the unit cell of the viewing grid is described by lattice cell vectors $$w_1 = \begin{pmatrix} w_{11} \\ w_{21} \end{pmatrix} \text{ and } w_2 = \begin{pmatrix} w_{12} \\ w_{22} \end{pmatrix}$$

and combined in the matrix $$W = \begin{pmatrix} w_{11} & w_{12} \\ w_{21} & w_{22} \end{pmatrix},$$

and $x_m$ and $y_m$ indicate the lattice points of the W-lattice,

- the magnification term $V(x,y, x_m,y_m)$ is either a scalar $$V(x, y, x_m, y_m) = \left( \frac{z_K(x, y, x_m, y_m)}{e} - 1 \right),$$

where e is the effective distance of the viewing grid from the motif image, or a matrix $V(x,y, x_m,y_m)=(A(x,y, x_m,y_m)-I)$, the matrix $$A(x, y, x_m, y_m) = \begin{pmatrix} a_{11}(x, y, x_m y_m) & a_{12}(x, y, x_m y_m) \\ a_{21}(x, y, x_m, y_m) & a_{22}(x, y, x_m, y_m) \end{pmatrix}$$

describing a desired magnification and movement behavior of the specified solid and I being the identity matrix, the vector $(c_1(x,y), c_2(x,y))$, where $0 \leq c_1(x,y), c_2(x,y) < 1$, indicates the relative position of the center of the viewing elements within the cells of the motif image, the vector $(d_1(x,y), d_2(x,y))$, where $0 \leq d_1(x,y), d_2(x,y) < 1$, represents a displacement of the cell boundaries in the motif image, and g(x,y) is a mask function for adjusting the visibility of the solid.

In the context of this description, as far as possible, scalars and vectors are referred to with small letters and matrices with capital letters. To improve diagram clarity, arrow symbols for marking vectors are dispensed with. Furthermore, for the person of skill in the art, it is normally clear from the context whether an occurring variable represents a scalar, a vector or a matrix, or whether multiple of these possibilities may be considered. For example, the magnification term V can represent either a scalar or a matrix, such that no unambiguous notation with small or capital letters is possible. In the respective context, however, it is always clear whether a scalar, a matrix or both alternatives may be considered.

The present invention refers basically to the production of three-dimensional images and to three-dimensional images having varying image contents when the viewing direction is changed. The three-dimensional images are referred to in the context of this description as solids. Here, the term "solid" refers especially to point sets, line systems or areal sections in three-dimensional space by which three-dimensional "solids" are described with mathematical means.

For $z_K(x,y,x_m,y_m)$, in other words the z-coordinate of a common point of the lines of sight with the solid, more than one value may be suitable, from which a value is formed or selected according to rules that are to be defined. This selection can occur, for example, by specifying an additional characteristic function, as explained below using the example of a non-transparent solid and a transparency step function that is specified in addition to the solid function f.

The depiction arrangement according to the present invention includes a raster image arrangement in which a motif (the specified solid(s)) appears to float, individually and not necessarily as an array, in front of or behind the image plane, or penetrates it. Upon tilting the security element that is formed by the stacked motif image and the viewing grid, the depicted three-dimensional image moves in directions specified by the magnification and movement matrix A. The motif image is not produced photographically, and also not by exposure through an exposure grid, but rather is constructed mathematically with a modulo algorithm wherein a plurality of different magnification and movement effects can be produced that are described in greater detail below.

In the known moiré magnifier mentioned above, the image to be depicted consists of individual motifs that are arranged periodically in a lattice. The motif image to be viewed through the lenses constitutes a greatly scaled down version of the image to be depicted, the area allocated to each individual motif corresponding to a maximum of about one lens cell. Due to the smallness of the lens cells, only relatively simple figures may be considered as individual motifs. In contrast to this, the depicted three-dimensional image in the "modulo mapping" described here is generally an individual image, it need not necessarily be composed of a lattice of periodically repeated individual motifs. The depicted three-dimensional image can constitute a complex individual image having a high resolution.

In the following, the name component "moiré" is used for embodiments in which the moiré effect is involved; when the name component "modulo" is used, a moiré effect is not necessarily involved. The name component "mapping" indicates arbitrary mappings, while the name component "magnifier" indicates that, not arbitrary mappings, but rather only magnifications are involved.

First, the modulo operation that occurs in the image function m(x,y) and from which the modulo magnification arrangement derives its name will be addressed briefly. For a vector s and an invertible 2×2 matrix W, the expression s mod W, as a natural expansion of the usual scalar modulo operation, represents a reduction of the vector s to the fundamental mesh of the lattice described by the matrix W (the "phase" of the vector s within the lattice W).

Formally, the expression s mod W can be defined as follows:

Let $$q = \begin{pmatrix} q_1 \\ q_2 \end{pmatrix} = W^{-1}s$$

and $q_i=n_i+p_i$ with integer $n_i \in Z$ and $0 \leq p_i < 1$ (i=1, 2), or in other words, let $n_i=\text{floor}(q_i)$ and $p_i=q_i \bmod 1$. Then $s=Wq=(n_1w_1+n_2w_2)+(p_1w_1+p_2w_2)$, wherein $(n_1w_1+n_2w_2)$ is a point on the lattice $WZ^2$ and $$s \bmod W=p_1w_1+p_2w_2$$

lies in the fundamental mesh of the lattice and indicates the phase of s with respect to the lattice W.

In a preferred embodiment of the depiction arrangement of the first aspect of the present invention, the magnification term is given by a matrix $V(x,y, x_m,y_m)=(A(x,y, x_m,y_m)-I)$, where $a_{11}(x,y, x_m,y_m)=z_K(x,y, x_m,y_m)/e$, such that the raster image arrangement depicts the specified solid when the motif image is viewed with the eye separation being in the x-direction. More generally, the magnification term can be given by a matrix $V(x,y, x_m,y_m)=(A(x,y, x_m,y_m)-I)$, where $(a_{11}\cos^2\psi+(a_{12}+a_{21})\cos\psi\sin\psi+a_{22}\sin^2\psi)=z_K(x,y, x_m,y_m)/e$, such that the raster image arrangement depicts the specified solid when the motif image is viewed with the eye separation being in the direction ψ to the x-axis.

In an advantageous development of the present invention, in addition to the solid function f(x,y,z), a transparency step function t(x,y,z) is given, wherein t(x,y,z) is equal to 1 if the solid f(x,y,z) covers the background at the position (x,y,z) and otherwise is equal to 0. Here, for a viewing direction substantially in the direction of the z-axis, for $z_K(x,y,x_m,y_m)$, the smallest value is to be taken for which $t(x,y,z_K)$ is not equal to zero in order to view the solid front from the outside.

Alternatively, for $z_K(x,y,x_m,y_m)$, also the largest value can be taken for which $t(x,y,z_K)$ is not equal to zero. In this case, a depth-reversed (pseudoscopic) image is created in which the solid back is viewed from the inside.

In all variants, the values $z_K(x,y,x_m,y_m)$ can, depending on the position of the solid with respect to the plane of projection (behind or in front of the plane of projection or penetrating the plane of projection), take on positive or negative values, or also be 0.

According to a second aspect of the present invention, a generic depiction arrangement includes a raster image arrangement for depicting a specified three-dimensional solid that is given by a height profile having a two-dimensional depiction of the solid f(x,y) and a height function z(x,y) that includes, for every point (x,y) of the specified solid, height/depth information, having a motif image that is subdivided into a plurality of cells, in each of which are arranged imaged regions of the specified solid, a viewing grid composed of a plurality of viewing elements for depicting the specified solid when the motif image is viewed with the aid of the viewing grid, the motif image exhibiting, with its subdivision into a plurality of cells, an image function m(x,y) that is given by $$m(x,y) = f\begin{pmatrix} x_K \\ y_K \end{pmatrix} \cdot g(x,y), \text{ where}$$

$$\begin{pmatrix} x_K \\ y_K \end{pmatrix} = \begin{pmatrix} x \\ y \end{pmatrix} + V(x,y)\cdot\left(\left(\left(\begin{pmatrix} x \\ y \end{pmatrix} + w_d(x,y)\right) \bmod W\right) - w_d(x,y) - w_c(x,y)\right),$$

$$w_d(x,y) = W\cdot\begin{pmatrix} d_1(x,y) \\ d_2(x,y) \end{pmatrix} \text{ and}$$

$$w_c(x,y) = W\cdot\begin{pmatrix} c_1(x,y) \\ c_2(x,y) \end{pmatrix},$$

wherein the unit cell of the viewing grid is described by lattice cell vectors $$w_1 = \begin{pmatrix} w_{11} \\ w_{21} \end{pmatrix} \text{ and } w_2 = \begin{pmatrix} w_{12} \\ w_{22} \end{pmatrix}$$

and combined in the matrix $$W = \begin{pmatrix} w_{11} & w_{12} \\ w_{21} & w_{22} \end{pmatrix},$$

the magnification term V(x,y) is either a scalar $$V(x,y) = \left(\frac{z(x,y)}{e} - 1\right),$$

where e is the effective distance of the viewing grid from the motif image, or a matrix V(x,y)=(A(x,y)−I), the matrix $$A(x,y) = \begin{pmatrix} a_{11}(x,y) & a_{12}(x,y) \\ a_{21}(x,y) & a_{22}(x,y) \end{pmatrix}$$

describing a desired magnification and movement behavior of the specified solid and I being the identity matrix, the vector $(c_1(x,y), c_2(x,y))$, where $0 \le c_1(x,y), c_2(x,y) < 1$, indicates the relative position of the center of the viewing elements within the cells of the motif image, the vector $(d_1(x,y), d_2(x,y))$, where $0 \le d_1(x,y), d_2(x,y) < 1$, represents a displacement of the cell boundaries in the motif image, and g(x,y) is a mask function for adjusting the visibility of the solid.

To simplify the calculation of the motif image, this height profile model presented as a second aspect of the present invention assumes a two-dimensional drawing f(x,y) of a solid, wherein, for each point x,y of the two-dimensional image of the solid, an additional z-coordinate z(x,y) indicates a height/depth information for that point. The two-dimensional drawing f(x,y) is a brightness distribution (grayscale image), a color distribution (color image), a binary distribution (line drawing) or a distribution of other image properties, such as transparency, reflectivity, density or the like.

In an advantageous development, in the height profile model, even two height functions $z_1(x,y)$ and $z_2(x,y)$ and two angles $\phi_1(x,y)$ and $\phi_2(x,y)$ are specified, and the magnification term is given by a matrix V(x,y)=(A(x,y)−I), where $$A(x,y) = \begin{pmatrix} a_{11}(x,y) & a_{12}(x,y) \\ a_{21}(x,y) & a_{22}(x,y) \end{pmatrix} = \begin{pmatrix} \frac{z_1(x,y)}{e} & \frac{z_2(x,y)}{e}\cdot\cot\phi_2(x,y) \\ \frac{z_1(x,y)}{e}\cdot\tan\phi_1(x,y) & \frac{z_2(x,y)}{e} \end{pmatrix}.$$

According to a variant, it can be provided that two height functions $z_1(x,y)$ and $z_2(x,y)$ are specified, and that the magnification term is given by a matrix V(x,y)=(A(x,y)−I), where $$A(x,y) = \begin{pmatrix} \frac{z_1(x,y)}{e} & 0 \\ 0 & \frac{z_2(x,y)}{e} \end{pmatrix},$$

such that, upon rotating the arrangement when viewing, the height functions $z_1(x,y)$ and $z_2(x,y)$ of the depicted solid transition into one another.

In a further variant, a height function z(x,y) and an angle $\phi_1$ are specified, and the magnification term is given by a matrix V(x,y)=(A(x,y)−I), where $$A(x,y) = \begin{pmatrix} \frac{z_1(x,y)}{e} & 0 \\ \frac{z_1(x,y)}{e}\cdot\tan\phi_1 & 1 \end{pmatrix}.$$

In this variant, upon viewing with the eye separation being in the x-direction and tilting the arrangement in the x-direction, the depicted solid moves in the direction $\phi_1$ to the x-axis. Upon tilting in the y-direction, no movement occurs.

In the last-mentioned variant, the viewing grid can also be a slot grid, cylindrical lens grid or cylindrical concave reflector grid whose unit cell is given by $$W = \begin{pmatrix} d & 0 \\ 0 & \infty \end{pmatrix}$$

where d is the slot or cylinder axis distance. Here, the cylindrical lens axis lies in the y-direction. Alternatively, the motif image can also be viewed with a circular aperture array or lens array where $$W = \begin{pmatrix} d & 0 \\ d \cdot \tan\beta & d_2 \end{pmatrix}$$

where $d_2$, $\beta$ are arbitrary.

If the cylindrical lens axis generally lies in an arbitrary direction $\gamma$, and if d again denotes the axis distance of the cylindrical lenses, then the lens grid is given by $$W = \begin{pmatrix} \cos\gamma & -\sin\gamma \\ \sin\gamma & \cos\gamma \end{pmatrix} \cdot \begin{pmatrix} d & 0 \\ 0 & \infty \end{pmatrix}$$

and the suitable matrix A in which no magnification or distortion is present in the direction $\gamma$ is:

$$A = \begin{pmatrix} \cos\gamma & -\sin\gamma \\ \sin\gamma & \cos\gamma \end{pmatrix} \cdot \begin{pmatrix} \frac{z_1(x, y)}{e} & 0 \\ \frac{z_1(x, y)}{e} \cdot \tan\phi_1 & 1 \end{pmatrix} \cdot \begin{pmatrix} \cos\gamma & \sin\gamma \\ -\sin\gamma & \cos\gamma \end{pmatrix}.$$

The pattern produced herewith for the print or embossing image to be disposed behind a lens grid W can be viewed not only with the slot aperture array or cylindrical lens array having the axis in the direction $\gamma$, but also with a circular aperture array or lens array where $$W = \begin{pmatrix} \cos\gamma & -\sin\gamma \\ \sin\gamma & \cos\gamma \end{pmatrix} \cdot \begin{pmatrix} d & 0 \\ d \cdot \tan\beta & \infty \end{pmatrix},$$

wherein $d_2$, $\beta$ can be arbitrary.

A further variant describes an orthoparallactic 3D effect. In this variant, two height functions $z_1(x,y)$ and $z_2(x,y)$ and an angle $\phi_2$ are specified, and the magnification term is given by a matrix $V(x,y)=(A(x,y)-I)$, where $$A(x, y) = \begin{pmatrix} 0 & \frac{z_2(x, y)}{e} \cdot \cot\phi_2 \\ \frac{z_1(x, y)}{e} & \frac{z_2(x, y)}{e} \end{pmatrix},$$

$$A(x, y) = \begin{pmatrix} 0 & \frac{z_2(x, y)}{e} \\ \frac{z_1(x, y)}{e} & 0 \end{pmatrix} \text{ if } \phi_2 = 0,$$

such that the depicted solid, upon viewing with the eye separation being in the x-direction and tilting the arrangement in the x-direction, moves normal to the x-axis. When viewed with the eye separation being in the y-direction and tilting the arrangement in the y-direction, the solid moves in the direction $\phi_2$ to the x-axis.

According to a third aspect of the present invention, a generic depiction arrangement includes a raster image arrangement for depicting a specified three-dimensional solid that is given by n sections $f_j(x,y)$ and n transparency step functions $t_j(x,y)$, where $j=1, \ldots n$, wherein, upon viewing with the eye separation being in the x-direction, the sections each lie at a depth $z_j$, $z_j > z_{j-1}$. Depending on the position of the solid with respect to the plane of projection (behind or in front of plane of projection or penetrating the plane of projection), $z_j$ can be positive or negative or also 0. $f_j(x,y)$ is the image function of the j-th section, and the transparency step function $t_j(x,y)$ is equal to 1 if, at the position (x,y), the section j covers objects lying behind it, and otherwise is equal to 0. The depiction arrangement includes a motif image that is subdivided into a plurality of cells, in each of which are arranged imaged regions of the specified solid, and a viewing grid composed of a plurality of viewing elements for depicting the specified solid when the motif image is viewed with the aid of the viewing grid, the motif image exhibiting, with its subdivision into a plurality of cells, an image function m(x,y) that is given by $$m(x, y) = f_j\begin{pmatrix} x_K \\ y_K \end{pmatrix} \cdot g(x, y), \text{ where}$$

$$\begin{pmatrix} x_K \\ y_K \end{pmatrix} = \begin{pmatrix} x \\ y \end{pmatrix} + V_j \cdot \left( \left( \left( \begin{pmatrix} x \\ y \end{pmatrix} + w_d(x, y) \right) \bmod W \right) - w_d(x, y) w_c(x, y) \right),$$

$$w_d(x, y) = W \cdot \begin{pmatrix} d_1(x, y) \\ d_2(x, y) \end{pmatrix}, \text{ and}$$

$$w_c(x, y) = W \cdot \begin{pmatrix} c_1(x, y) \\ c_2(x, y) \end{pmatrix},$$

wherein, for j, the smallest or the largest index is to be taken for which $$t_j\begin{pmatrix} x_K \\ y_K \end{pmatrix}$$

is not equal to zero, and wherein the unit cell of the viewing grid is described by lattice cell vectors $$w_1 = \begin{pmatrix} w_{11} \\ w_{21} \end{pmatrix} \text{ and } w_2 = \begin{pmatrix} w_{12} \\ w_{22} \end{pmatrix}$$

and combined in the matrix $$W = \begin{pmatrix} w_{11} & w_{12} \\ w_{21} & w_{22} \end{pmatrix},$$

the magnification term $V_j$ is either a scalar $$V_j = \left(\frac{z_j}{e} - 1\right),$$

where e is the effective distance of the viewing grid from the motif image, or a matrix $V_j=(A_j-I)$, the matrix $$A_j = \begin{pmatrix} a_{j11} & a_{j12} \\ a_{j21} & a_{j22} \end{pmatrix}$$

describing a desired magnification and movement behavior of the specified solid and I being the identity matrix, the vector $(c_1(x,y), c_2(x,y))$, where $0 \le c_1(x,y), c_2(x,y) < 1$, indicates the relative position of the center of the viewing elements within the cells of the motif image, the vector $(d_1(x,y), d_2(x,y))$, where $0 \le d_1(x,y), d_2(x,y) < 1$, represents a displacement of the cell boundaries in the motif image, and $g(x,y)$ is a mask function for adjusting the visibility of the solid.

If, in selecting the index j, the smallest index is taken for which $$t_j\begin{pmatrix} x_K \\ y_K \end{pmatrix}$$

is not equal to zero, then an image is obtained that shows the solid front from the outside. If, in contrast, the largest index is taken for which $$t_j\begin{pmatrix} x_K \\ y_K \end{pmatrix}$$

is not equal to zero, then a depth-reversed (pseudoscopic) image is obtained that shows the solid back from the inside.

In the section plane model of the third aspect of the present invention, to simplify the calculation of the motif image, the three-dimensional solid is specified by n sections $f_j(x,y)$ and n transparency step functions $t_j(x,y)$, where $j=1, \ldots n$, that each lie at a depth $z_j$, $z_j > z_{j-1}$ upon viewing with the eye separation being in the x-direction. Here, $f_j(x,y)$ is the image function of the j-th section and can indicate a brightness distribution (grayscale image), a color distribution (color image), a binary distribution (line drawing) or also other image properties, such as transparency, reflectivity, density or the like. The transparency step function $t_j(x,y)$ is equal to 1 if, at the position (x,y), the section j covers objects lying behind it, and otherwise is equal to 0.

In an advantageous embodiment of the section plane model, a change factor k not equal to 0 is specified and the magnification term is given by a matrix $V_j=(A_j-I)$, where $$A_j = \begin{pmatrix} \frac{z_j}{e} & 0 \\ 0 & k\cdot\frac{z_j}{e} \end{pmatrix},$$

such that, upon rotating the arrangement, the depth impression of the depicted solid changes by the change factor k.

In an advantageous variant, a change factor k not equal to 0 and two angles $\phi_1$ and $\phi_2$ are specified, and the magnification term is given by a matrix $V_j=(A_j-I)$, where $$A_j = \begin{pmatrix} \frac{z_j}{e} & k\cdot\frac{z_j}{e}\cdot\cot\phi_2 \\ \frac{z_j}{e}\cdot\tan\phi_1 & k\cdot\frac{z_j}{e} \end{pmatrix}$$

such that the depicted solid, upon viewing with the eye separation being in the x-direction and tilting the arrangement in the x-direction, moves in the direction $\phi_1$ to the x-axis, and upon viewing with the eye separation being in the y-direction and tilting the arrangement in the y-direction, moves in the direction $\phi_2$ to the x-axis and is stretched by the change factor k in the depth dimension.

According to a further advantageous variant, an angle $\phi_1$ is specified and the magnification term is given by a matrix $V_j=(A_j-I)$, where $$A_j = \begin{pmatrix} \frac{z_j}{e} & 0 \\ \frac{z_j}{e}\cdot\tan\phi_1 & 1 \end{pmatrix}$$

such that the depicted solid, upon viewing with the eye separation being in the x-direction and tilting the arrangement in the x-direction, moves in the direction $\phi_1$ to the x-axis, and no movement occurs upon tilting in the y-direction.

In the last-mentioned variant, the viewing grid can also be a slot grid or cylindrical lens grid having the slot or cylinder axis distance d. If the cylindrical lens axis lies in the y-direction, then the unit cell of the viewing grid is given by $$W = \begin{pmatrix} d & 0 \\ 0 & \infty \end{pmatrix}.$$

As already described above in connection with the second aspect of the present invention, here, too, the motif image can be viewed with a circular aperture array or lens array where $$W = \begin{pmatrix} d & 0 \\ d\cdot\tan\beta & d_2 \end{pmatrix},$$

where $d_2$, $\beta$ are arbitrary, or with a cylindrical lens grid in which the cylindrical lens axes lie in an arbitrary direction $\gamma$. The form of W and A obtained by rotating by an angle $\gamma$ was already explicitly specified above.

According to a further advantageous variant, a change factor k not equal to 0 and an angle $\phi$ are specified and the magnification term is given by a matrix $V_j=(A_j-I)$, where $$A_j = \begin{pmatrix} 0 & k\cdot\frac{z_j}{e}\cdot\cot\phi \\ \frac{z_j}{e} & k\cdot\frac{z_j}{e} \end{pmatrix}, A_j = \begin{pmatrix} 0 & k\cdot\frac{z_j}{e} \\ \frac{z_j}{e} & 0 \end{pmatrix} \text{ if } \phi = 0$$

such that the depicted solid, upon horizontal tilting, moves normal to the tilt direction, and upon vertical tilting, in the direction $\phi$ to the x-axis.

In a further variant, a change factor k not equal to 0 and an angle $\phi_1$ are specified and the magnification term is given by a matrix $V_j=(A_j-I)$, where $$A_j = \begin{pmatrix} \frac{z_j}{e} & k\cdot\frac{z_j}{e}\cdot\cot\phi_1 \\ \frac{z_j}{e}\cdot\tan\phi_1 & k\cdot\frac{z_j}{e} \end{pmatrix}$$

such that, irrespective of the tilt direction, the depicted solid always moves in the direction $\phi_1$ to the x-axis.

In all cited aspects of the present invention, the viewing elements of the viewing grid are preferably arranged periodically or locally periodically, the local period parameters in the latter case preferably changing only slowly in relation to the periodicity length. Here, the periodicity length or the local periodicity length is especially between 3 μm and 50 μm, preferably between 5 μm and 30 μm, particularly preferably between about 10 μm and about 20 μm. Also an abrupt change in the periodicity length is possible if it was previously kept constant or nearly constant over a segment that is large compared with the periodicity length, for example for more than 20, 50 or 100 periodicity lengths.

In all aspects of the present invention, the viewing elements can be formed by non-cylindrical microlenses, especially by microlenses having a circular or polygonally delimited base area, or also by elongated cylindrical lenses whose dimension in the longitudinal direction is more than 250 μm, preferably more than 300 μm, particularly preferably more than 500 μm and especially more than 1 mm. In further preferred variants of the present invention, the viewing elements are formed by circular apertures, slit apertures, circular or slit apertures provided with reflectors, aspherical lenses, Fresnel lenses, GRIN (Gradient Refractive Index) lenses, zone plates, holographic lenses, concave reflectors, Fresnel reflectors, zone reflectors or other elements having a focusing or also masking effect.

In preferred embodiments of the height profile model, it is provided that the support of the image function $$f\left((A-I)\cdot\begin{pmatrix}x\\y\end{pmatrix}\right)$$

is greater than the unit cell of the viewing grid W. Here, the support of a function denotes, in the usual manner, the closure of the set in which the function is not zero. Also for the section plane model, the supports of the sectional images $$f_j\left((A-I)\cdot\begin{pmatrix}x\\y\end{pmatrix}\right)$$

are preferably greater than the unit cell of the viewing grid W.

In advantageous embodiments, the depicted three-dimensional image exhibits no periodicity, in other words, is a depiction of an individual 3D motif.

In an advantageous variant of the present invention, the viewing grid and the motif image of the depiction arrangement are firmly joined together and, in this way, form a security element having a stacked, spaced-apart viewing grid and motif image. The motif image and the viewing grid are advantageously arranged at opposing surfaces of an optical spacing layer. The security element can especially be a security thread, a tear strip, a security band, a security strip, a patch or a label for application to a security paper, value document or the like. The total thickness of the security element is especially below 50 μm, preferably below 30 μm and particularly preferably below 20 μm.

According to another, likewise advantageous variant of the present invention, the viewing grid and the motif image of the depiction arrangement are arranged at different positions of a data carrier such that the viewing grid and the motif image are stackable for self-authentication, and form a security element in the stacked state. The viewing grid and the motif image are especially stackable by bending, creasing, buckling or folding the data carrier.

According to a further, likewise advantageous variant of the present invention, the motif image is displayed by an electronic display device and the viewing grid is firmly joined with the electronic display device for viewing the displayed motif image. Instead of being firmly joined with the electronic display device, the viewing grid can also be a separate viewing grid that is bringable onto or in front of the electronic display device for viewing the displayed motif image.

In the context of this description, the security element can thus be formed both by a viewing grid and motif image that are firmly joined together, as a permanent security element, and by a viewing grid that exists spatially separately and an associated motif image, the two elements forming, upon stacking, a security element that exists temporarily. Statements in the description about the movement behavior or the visual impression of the security element refer both to firmly joined permanent security elements and to temporary security elements formed by stacking.

In all variants of the present invention, the cell boundaries in the motif image can advantageously be location-independently displaced such that the vector $(d_1(x,y), d_2(x,y))$ occurring in the image function m(x,y) is constant. Alternatively, the cell boundaries in the motif image can also be location-dependently displaced. In particular, the motif image can exhibit two or more subregions having a different, in each case constant, cell grid.

A location-dependent vector $(d_1(x,y), d_2(x,y))$ can also be used to define the contour shape of the cells in the motif image. For example, instead of parallelogram-shaped cells, also cells having another uniform shape can be used that match one another such that the area of the motif image is gaplessly filled (parqueting the area of the motif image). Here, it is possible to define the cell shape as desired through the choice of the location-dependent vector $(d_1(x,y), d_2(x,y))$. In this way, the designer especially influences the viewing angles at which motif jumps occur.

The motif image can also be broken down into different regions in which the cells each exhibit an identical shape, while the cell shapes differ in the different regions. This causes, upon tilting the security element, portions of the motif that are allocated to different regions to jump at different tilt angles. If the regions having different cells are large enough that they are perceptible with the naked eye, then in this way, an additional piece of visible information can be accommodated in the security element. If, in contrast, the regions are microscopic, in other words perceptible only with magnifying auxiliary means, then in this way, an additional piece of hidden information that can serve as a higher-level security feature can be accommodated in the security element.

Further, a location-dependent vector $(d_1(x,y), d_2(x,y))$ can also be used to produce cells that all differ from one another with respect to their shape. In this way, it is possible to produce an entirely individual security feature that can be checked, for example, by means of a microscope.

The mask function g that occurs in the image function m(x,y) of all variants of the present invention is, in many cases, advantageously identical to 1. In other, likewise advantageous designs, the mask function g is zero in subregions, especially in edge regions of the cells of the motif image, and then limits the solid angle range at which the three-dimensional image is visible. In addition to an angle limit, the mask function can also describe an image field limit in which the three-dimensional image does not become visible, as explained in greater detail below.

In advantageous embodiments of all variants of the present invention, it is further provided that the relative position of the center of the viewing elements is location independent within the cells of the motif image, in other words, the vector $(c_1(x, y), c_2(x,y))$ is constant. In other designs, however, it can also be appropriate to design the relative position of the center of the viewing elements to be location dependent within the cells of the motif image, as explained in greater detail below.

According to a development of the present invention, to amplify the three-dimensional visual impression, the motif image is filled with Fresnel patterns, blaze lattices or other optically effective patterns.

In the thus-far described aspects of the present invention, the raster image arrangement of the depiction arrangement always depicts an individual three-dimensional image. In further aspects, the present invention also comprises designs in which multiple three-dimensional images are depicted simultaneously or in alternation.

For this, a depiction arrangement corresponding to the general perspective of the first inventive aspect includes, according to a fourth inventive aspect, a raster image arrangement for depicting a plurality of specified three-dimensional solids that are given by solid functions $f_i(x,y,z)$, i=1, 2, . . . N, where N≥1, having

- a motif image that is subdivided into a plurality of cells, in each of which are arranged imaged regions of the specified solids,
- a viewing grid composed of a plurality of viewing elements for depicting the specified solids when the motif image is viewed with the aid of the viewing grid,
- the motif image exhibiting, with its subdivision into a plurality of cells, an image function m(x,y) that is given by
- $m(x,y)=F(h_1, h_2, \ldots h_N)$, having the describing functions $$h_i(x, y) = f_i\begin{pmatrix} x_{iK} \\ y_{iK} \\ z_{iK}(x, y, x_m, y_m) \end{pmatrix} \cdot g_i(x, y), \text{ where}$$

$$\begin{pmatrix} x_{iK} \\ y_{iK} \end{pmatrix} = \begin{pmatrix} x \\ y \end{pmatrix} + V_i(x, y, x_m, y_m) \cdot \left( \left( \left( \begin{pmatrix} x \\ y \end{pmatrix} + w_{di}(x, y) \right) \bmod W \right) - w_{di}(x, y) - w_{ci}(x, y) \right)$$

$$w_{di}(x, y) = W \cdot \begin{pmatrix} d_{i1}(x, y) \\ d_{i2}(x, y) \end{pmatrix} \text{ and } w_{ci}(x, y) = W \cdot \begin{pmatrix} c_{i1}(x, y) \\ c_{i2}(x, y) \end{pmatrix},$$

- wherein $F(h_1, h_2, \ldots h_N)$ is a master function that indicates an operation on the N describing functions $h_i(x,y)$, and wherein
- the unit cell of the viewing grid is described by lattice cell vectors $$w_1 = \begin{pmatrix} w_{11} \\ w_{21} \end{pmatrix} \text{ and } w_2 = \begin{pmatrix} w_{12} \\ w_{22} \end{pmatrix}$$

and combined in the matrix $$W = \begin{pmatrix} w_{11} & w_{12} \\ w_{21} & w_{22} \end{pmatrix},$$

and $x_m$ and $y_m$ indicate the lattice points of the W-lattice, the magnification terms $V_i(x,y, x_m,y_m)$ are either scalars $$V_i(x, y, x_m, y_m) = \left( \frac{z_{iK}(x, y, x_m, y_m)}{e} - 1 \right),$$

where e is the effective distance of the viewing grid from the motif image, or matrices $V_i(x,y, x_m,y_m)=(A_i(x,y, x_m,y_m)-I)$, the matrices $$A_i(x, y, x_m, y_m) = \begin{pmatrix} a_{i11}(x, y, x_m, y_m) & a_{i12}(x, y, x_m, y_m) \\ a_{i21}(x, y, x_m, y_m) & a_{i22}(x, y, x_m, y_m) \end{pmatrix}$$

each describing a desired magnification and movement behavior of the specified solid $f_i$ and I being the identity matrix,

- the vectors $(c_{i1}(x,y), c_{i2}(x,y))$, where $0 \le c_{i1}(x,y), c_{i2}(x,y) < 1$, indicate in each case, for the solid $f_i$, the relative position of the center of the viewing elements within the cells i of the motif image,
- the vectors $(d_{i1}(x,y), d_{i2}(x,y))$, where $0 \le d_{i1}(x,y), d_{i2}(x,y) < 1$, each represent a displacement of the cell boundaries in the motif image, and
- $g_i(x,y)$ are mask functions for adjusting the visibility of the solid $f_i$.

For $z_{iK}(x,y,x_m,y_m)$, in other words the z-coordinate of a common point of the lines of sight with the solid $f_i$, more than one value may be suitable from which a value is formed or selected according to rules that are to be defined. For example, in a non-transparent solid, in addition to the solid function $f_i(x,y,z)$, a transparency step function (characteristic function) $t_i(x,y,z)$ can be specified, wherein $t_i(x,y,z)$ is equal to 1 if, at the position (x,y,z), the solid $f_i(x,y,z)$ covers the background, and otherwise is equal to 0. For a viewing direction substantially in the direction of the z-axis, for $z_{iK}(x,y,x_m, y_m)$, in each case the smallest value is now to be taken for which $t_i(x,y,z_{iK})$ is not equal to 0, in the event that one wants to view the solid front.

The values $z_{iK}(x,y,x_m,y_m)$ can, depending on the position of the solid in relation to the plane of projection (behind or in front of the plane of projection or penetrating the plane of projection) take on positive or negative values, or also be 0.

In an advantageous development of the present invention, in addition to the solid functions $f_i(x,y,z)$, transparency step functions $t_i(x,y,z)$ are given, wherein $t_i(x,y,z)$ is equal to 1 if, at the position (x,y,z), the solid $f_i(x,y,z)$ covers the background, and otherwise is equal to 0. Here, for a viewing direction substantially in the direction of the z-axis, for $z_{iK}(x,y,x_m,y_m)$, the smallest value is to be taken for which $t_i(x,y, z_K)$ is not equal to zero in order to view the solid front of the solid $f_i$ from the outside. Alternatively, for $z_{iK}(x,y,x_m,y_m)$, also the largest value can be taken for which $t_i(x,y,z_K)$ is not equal to zero in order to view the solid back of the solid $f_i$ from the inside.

For this, a depiction arrangement corresponding to the height profile model of the second inventive aspect includes, according to a fifth inventive aspect, a raster image arrangement for depicting a plurality of specified three-dimensional solids that are given by height profiles having two-dimensional depictions of the solids $f_i(x,y)$, i=1, 2, . . . N, where N≥1, and by height functions $z_i(x,y)$, each of which includes height/depth information for every point (x,y) of the specified solid $f_i$, having a motif image that is subdivided into a plurality of cells, in each of which are arranged imaged regions of the specified solids, a viewing grid composed of a plurality of viewing elements for depicting the specified solids when the motif image is viewed with the aid of the viewing grid, the motif image exhibiting, with its subdivision into a plurality of cells, an image function m(x,y) that is given by $m(x,y)=F(h_1, h_2, \ldots h_N)$, having the describing functions $$h_i(x, y) = f_i\begin{pmatrix} x_{iK} \\ y_{iK} \end{pmatrix} \cdot g_i(x, y), \text{ where}$$

$$\begin{pmatrix} x_{iK} \\ y_{iK} \end{pmatrix} = \begin{pmatrix} x \\ y \end{pmatrix} + V_i(x, y) \cdot \left( \left( \left( \begin{pmatrix} x \\ y \end{pmatrix} + w_{di}(x, y) \right) \bmod W \right) - w_{di}(x, y) - w_{ci}(x, y) \right)$$

$$w_{di}(x, y) = W \cdot \begin{pmatrix} d_{i1}(x, y) \\ d_{i2}(x, y) \end{pmatrix} \text{ and } w_{ci}(x, y) = \begin{pmatrix} c_{i1}(x, y) \\ c_{i2}(x, y) \end{pmatrix},$$

wherein $F(h_1, h_2, \ldots h_N)$ is a master function that indicates an operation on the N describing functions $h_i(x,y)$, and wherein the unit cell of the viewing grid is described by lattice cell vectors $$w_1 = \begin{pmatrix} w_{11} \\ w_{21} \end{pmatrix} \text{ and } w_2 = \begin{pmatrix} w_{12} \\ w_{22} \end{pmatrix}$$

and combined in the matrix $$W = \begin{pmatrix} w_{11} & w_{12} \\ w_{21} & w_{22} \end{pmatrix},$$

the magnification terms $V_i(x,y)$ are either scalars $$V_i(x, y) = \left( \frac{z_i(x, y)}{e} - 1 \right),$$

where e is the effective distance of the viewing grid from the motif image, or matrices $V_i(x,y)=(A_i(x,y)-I)$, the matrices $$A_i(x, y) = \begin{pmatrix} a_{i11}(x, y) & a_{i12}(x, y) \\ a_{i21}(x, y) & a_{i22}(x, y) \end{pmatrix}$$

each describing a desired magnification and movement behavior of the specified solid $f_i$ and I being the identity matrix, the vectors $(c_{i1}(x,y), c_{i2}(x,y))$, where $0 \le c_{i1}(x,y), c_{i2}(x,y) < 1$, indicate in each case, for the solid $f_i$, the relative position of the center of the viewing elements within the cells i of the motif image, the vectors $(d_{i1}(x,y), d_{i2}(x,y))$, where $0 \le d_{i1}(x,y), d_{i2}(x,y) < 1$, each represent a displacement of the cell boundaries in the motif image, and $g_i(x,y)$ are mask functions for adjusting the visibility of the solid $f_i$.

A depiction arrangement corresponding to the section plane model of the third inventive aspect includes, according to a sixth inventive aspect, a raster image arrangement for depicting a plurality (N≥1) of specified three-dimensional solids that are each given by $n_i$ sections $f_{ij}(x,y)$ and $n_i$ transparency step functions $t_{ij}(x,y)$, where i=1, 2, . . . N and j=1, 2, . . . $n_i$, wherein, upon viewing with the eye separation being in the x-direction, the sections of the solid i each lie at a depth $z_{ij}$ and wherein $f_{ij}(x,y)$ is the image function of the j-th section of the i-th solid, and the transparency step function $t_{ij}(x,y)$ is equal to 1 if, at the position (x,y), the section j of the solid i covers objects lying behind it, and otherwise is equal to 0, having a motif image that is subdivided into a plurality of cells, in each of which are arranged imaged regions of the specified solids, a viewing grid composed of a plurality of viewing elements for depicting the specified solids when the motif image is viewed with the aid of the viewing grid, the motif image exhibiting, with its subdivision into a plurality of cells, an image function m(x,y) that is given by $m(x,y)=F(h_{11}, h_{12}, \ldots, h_{1n_1}, h_{21}, h_{22}, \ldots, h_{2n_2}, \ldots, h_{N1}, h_{N2}, \ldots, h_{Nn_N})$, having the describing functions $$h_{ij} = f_{ij}\begin{pmatrix} x_{iK} \\ y_{iK} \end{pmatrix} \cdot g_{ij}(x, y), \text{ where}$$

$$\begin{pmatrix} x_{iK} \\ y_{iK} \end{pmatrix} = \begin{pmatrix} x \\ y \end{pmatrix} + V_{ij} \cdot \left( \left( \left( \begin{pmatrix} x \\ y \end{pmatrix} + w_{di}(x, y) \right) \bmod W \right) - w_{di}(x, y) - w_{ci}(x, y) \right)$$

$$w_{di}(x, y) = W \cdot \begin{pmatrix} d_{i1}(x, y) \\ d_{i2}(x, y) \end{pmatrix} \text{ and } w_{ci}(x, y) = W \cdot \begin{pmatrix} c_{i1}(x, y) \\ c_{i2}(x, y) \end{pmatrix},$$

wherein, for ij in each case, the index pair is to be taken for which $$t_{ij}\begin{pmatrix} x_{iK} \\ y_{iK} \end{pmatrix}$$

is not equal to zero and $z_{ij}$ is minimal or maximal, and wherein $F(h_{11}, h_{12}, \ldots, h_{1n_1}, h_{21}, h_{22}, \ldots, h_{2n_2}, \ldots, h_{N1}, h_{N2}, \ldots, h_{Nn_N})$ is a master function that indicates an operation on of the describing functions $h_{ij}(x,y)$, and wherein the unit cell of the viewing grid is described by lattice cell vectors $$w_1 = \begin{pmatrix} w_{11} \\ w_{21} \end{pmatrix} \text{ and } w_2 = \begin{pmatrix} w_{12} \\ w_{22} \end{pmatrix}$$

and combined in the matrix $$W = \begin{pmatrix} w_{11} & w_{12} \\ w_{21} & w_{22} \end{pmatrix},$$

the magnification terms $V_{ij}$ are either scalars $$V_{ij} = \left( \frac{z_{ij}}{e} - 1 \right),$$

where e is the effective distance of the viewing grid from the motif image, or matrices $V_{ij}=(A_{ij}-I)$, the matrices $$A_{ij}=\begin{pmatrix} a_{ij11} & a_{ij12} \\ a_{ij21} & a_{ij22} \end{pmatrix}$$

each describing a desired magnification and movement behavior of the specified solid $f_i$ and I being the identity matrix, the vectors $(c_{i1}(x,y), c_{i2}(x,y))$, where $0 \leq c_{i1}(x,y), c_{i2}(x,y) < 1$, indicate in each case, for the solid $f_i$, the relative position of the center of the viewing elements within the cells i of the motif image, the vectors $(d_{i1}(x,y), d_{i2}(x,y))$, where $0 \leq d_{i1}(x,y), d_{i2}(x,y) < 1$, each represent a displacement of the cell boundaries in the motif image, and $g_{ij}(x,y)$ are mask functions for adjusting the visibility of the solid $f_i$.

All explanations given for an individual solid f in the first three aspects of the present invention also apply to the plurality of solids $f_i$ of the more general raster image arrangements of the fourth to sixth aspect of the present invention. In particular, at least one (or also all) of the describing functions of the fourth, fifth or sixth aspect of the present invention can be designed as specified above for the image function m(x,y) of the first, second or third aspect of the present invention.

The raster image arrangement advantageously depicts an alternating image, a motion image or a morph image. Here, the mask functions $g_i$ and $g_{ij}$ can especially define a strip-like or checkerboard-like alternation of the visibility of the solids $f_i$. Upon tilting, an image sequence can advantageously proceed along a specified direction; in this case, expediently, strip-like mask functions $g_i$ and $g_{ij}$ are used, in other words, mask functions that, for each i, are not equal to zero only in a strip that wanders within the unit cell. In the general case, however, also mask functions can be chosen that let an image sequence proceed through curved, meander-shaped or spiral-shaped tilt movements.

While, in alternating images (tilt images) or other motion images, ideally only one three-dimensional image is visible simultaneously in each case, the present invention also includes designs in which two or more three-dimensional images (solids) $f_i$ are simultaneously visible for the viewer. Here, the master function F advantageously constitutes the sum function, the maximum function, an OR function, an XOR function or another logic function.

The motif image is especially present in an embossed or printed layer. According to an advantageous development of the present invention, the security element exhibits, in all aspects, an opaque cover layer to cover the raster image arrangement in some regions. Thus, within the covered region, no modulo magnification effect occurs, such that the optically variable effect can be combined with conventional pieces of information or with other effects. This cover layer is advantageously present in the form of patterns, characters or codes and/or exhibits gaps in the form of patterns, characters or codes.

If the motif image and the viewing grid are arranged at opposing surfaces of an optical spacing layer, the spacing layer can comprise, for example, a plastic foil and/or a lacquer layer.

The permanent security element itself preferably constitutes a security thread, a tear strip, a security band, a security strip, a patch or a label for application to a security paper, value document or the like. In an advantageous embodiment, the security element can span a transparent or uncovered region of a data carrier. Here, different appearances can be realized on different sides of the data carrier. Also two-sided designs can be used in which viewing grids are arranged on both sides of a motif image.

The raster image arrangements according to the present invention can be combined with other security features, for example with diffractive patterns, with hologram patterns in all embodiment variants, metalized or not metalized, with subwavelength patterns, metalized or not metalized, with subwavelength lattices, with layer systems that display a color shift upon tilting, semitransparent or opaque, with diffractive optical elements, with refractive optical elements, such as prism-type beam shapers, with special hole shapes, with security features having a specifically adjusted electrical conductivity, with incorporated substances having a magnetic code, with substances having a phosphorescent, fluorescent or luminescent effect, with security features based on liquid crystals, with matte patterns, with micromirrors, with elements having a blind effect, or with sawtooth patterns. Further security features with which the raster image arrangements according to the present invention can be combined are specified in publication WO 2005/052650 A2 on pages 71 to 73; these are incorporated herein by reference.

In all aspects of the present invention, the image contents of individual cells of the motif image can be interchanged according to the determination of the image function m(x,y).

The present invention also includes methods for manufacturing the depiction arrangements according to the first to sixth aspect of the present invention, in which a motif image is calculated from one or more specified three-dimensional solids. The approach and the required computational relationships for the general perspective, the height profile model and the section plane model were already specified above and are also explained in greater detail through the following exemplary embodiments.

Within the scope of the present invention, the size of the motif image elements and of the viewing elements is typically about 5 to 50 μm such that also the influence of the modulo magnification arrangement on the thickness of the security elements can be kept small. The manufacture of such small lens arrays and such small images is described, for example, in publication DE 10 2005 028162 A1, the disclosure of which is incorporated herein by reference.

A typical approach here is as follows: To manufacture micropatterns (microlenses, micromirrors, microimage elements), semiconductor patterning techniques can be used, for example photolithography or electron beam lithography. A particularly suitable method consists in exposing patterns with the aid of a focused laser beam in photoresist. Thereafter, the patterns, which can exhibit binary or more complex three-dimensional cross-section profiles, are exposed with a developer. As an alternative method, laser ablation can be used.

The original obtained in one of these ways can be further processed into an embossing die with whose aid the patterns can be replicated, for example by embossing in UV lacquer, thermoplastic embossing, or by the microintaglio technique described in publication WO 2008/00350 A1. The last-mentioned technique is a microintaglio technique that combines the advantages of printing and embossing technologies. Details of this microintaglio method and the advantages associated therewith are set forth in publication WO 2008/00350 A1, the disclosure of which is incorporated herein by reference.

An array of different embodiment variants are suitable for the end product: embossing patterns evaporated with metal, coloring through metallic nanopatterns, embossing in colored UV lacquer, microintaglio printing according to publication WO 2008/00350 A1, coloring the embossing patterns and subsequently squeegeeing the embossed foil, or also the method described in German patent application 10 2007 062 089.8 for selectively transferring an imprinting substance to elevations or depressions of an embossing pattern. Alternatively, the motif image can be written directly into a light-sensitive layer with a focused laser beam.

The microlens array can likewise be manufactured by means of laser ablation or grayscale lithography. Alternatively, a binary exposure can occur, the lens shape first being created subsequently through plasticization of photoresist ("thermal reflow"). From the original—as in the case of the micropattern array—an embossing die can be produced with whose aid mass production can occur, for example through embossing in UV lacquer or thermoplastic embossing.

If the modulo magnifier principle or modulo mapping principle is applied in decorative articles (e.g. greeting cards, pictures as wall decoration, curtains, table covers, key rings, etc.) or in the decoration of products, then the size of the images and lenses to be introduced is about 50 to 1,000 μm. Here, the motif images to be introduced can be printed in color with conventional printing methods, such as offset printing, intaglio printing, relief printing, screen printing, or digital printing methods, such as inkjet printing or laser printing.

The modulo magnifier principle or modulo mapping principle according to the present invention can also be applied in three-dimensional-appearing computer and television images that are generally displayed on an electronic display device. In this case, the size of the images to be introduced and the size of the lenses in the lens array to be attached in front of the screen is about 50 to 500 μm. The screen resolution should be at least one order of magnitude better, such that high-resolution screens are required for this application.

Finally, the present invention also includes a security paper for manufacturing security or value documents, such as banknotes, checks, identification cards, certificates and the like, having a depiction arrangement of the kind described above. The present invention further includes a data carrier, especially a branded article, a value document, a decorative article, such as packaging, postcards or the like, having a depiction arrangement of the kind described above. Here, the viewing grid and/or the motif image of the depiction arrangement can be arranged contiguously, on sub-areas or in a window region of the data carrier.

The present invention also relates to an electronic display arrangement having an electronic display device, especially a computer or television screen, a control device and a depiction arrangement of the kind described above. Here, the control device is designed and adjusted to display the motif image of the depiction arrangement on the electronic display device. Here, the viewing grid for viewing the displayed motif image can be joined with the electronic display device or can be a separate viewing grid that is bringable onto or in front of the electronic display device for viewing the displayed motif image.

All described variants can be embodied having two-dimensional lens grids in lattice arrangements of arbitrary low or high symmetry or in cylindrical lens arrangements.

All arrangements can also be calculated for curved surfaces, as basically described in publication WO 2007/076952 A2, the disclosure of which is incorporated herein by reference.

Further exemplary embodiments and advantages of the present invention are described below with reference to the drawings. To improve clarity, a depiction to scale and proportion was dispensed with in the drawings.

Figure 2:
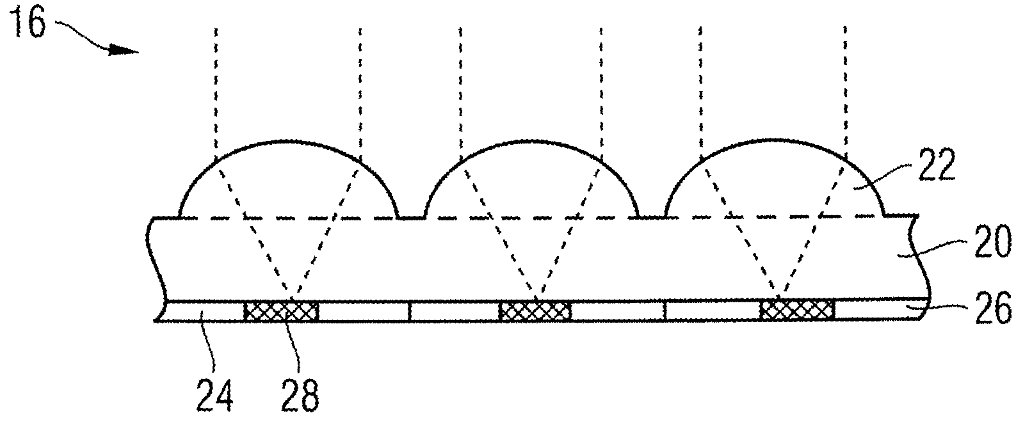
Figure 3:
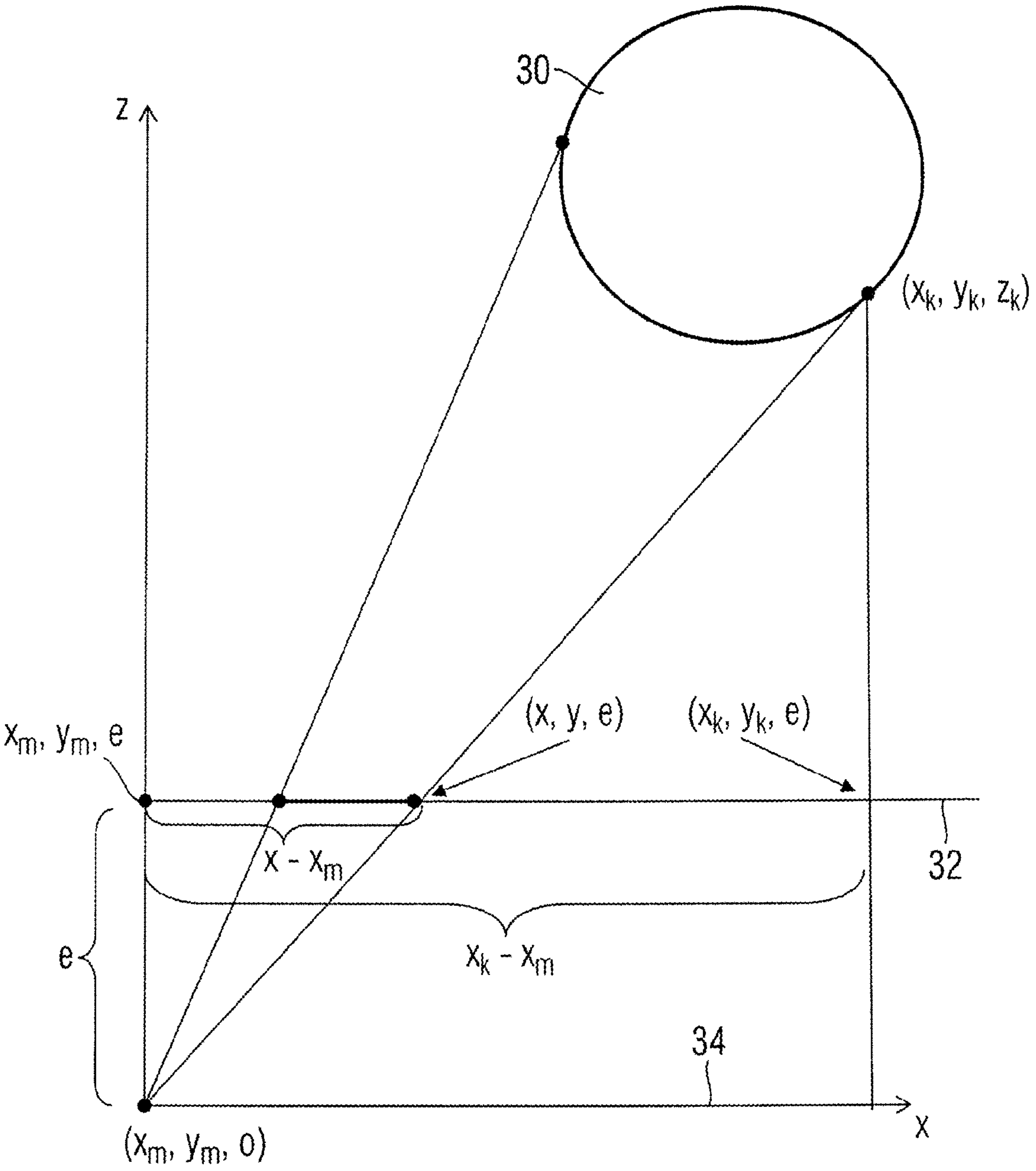
Figure 4A:
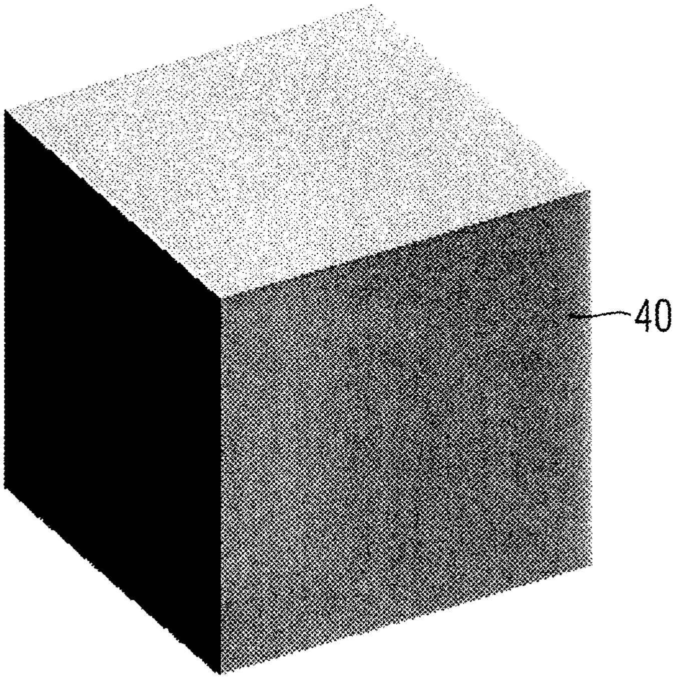
Figure 4B:
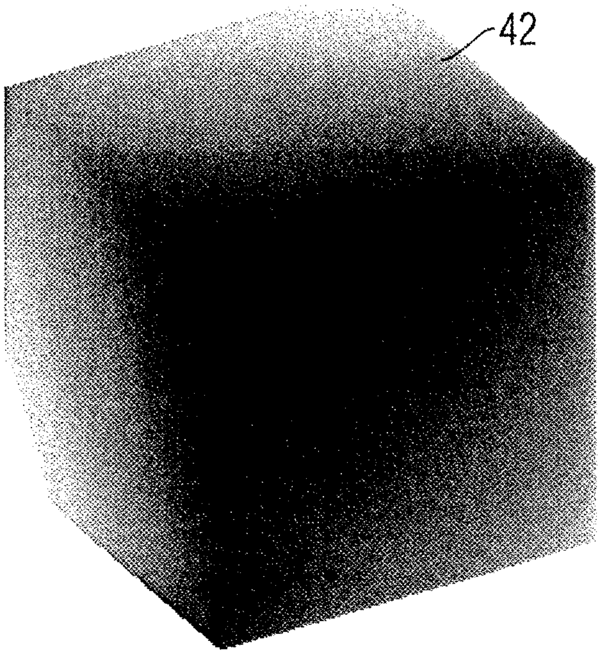
Figure 4C:
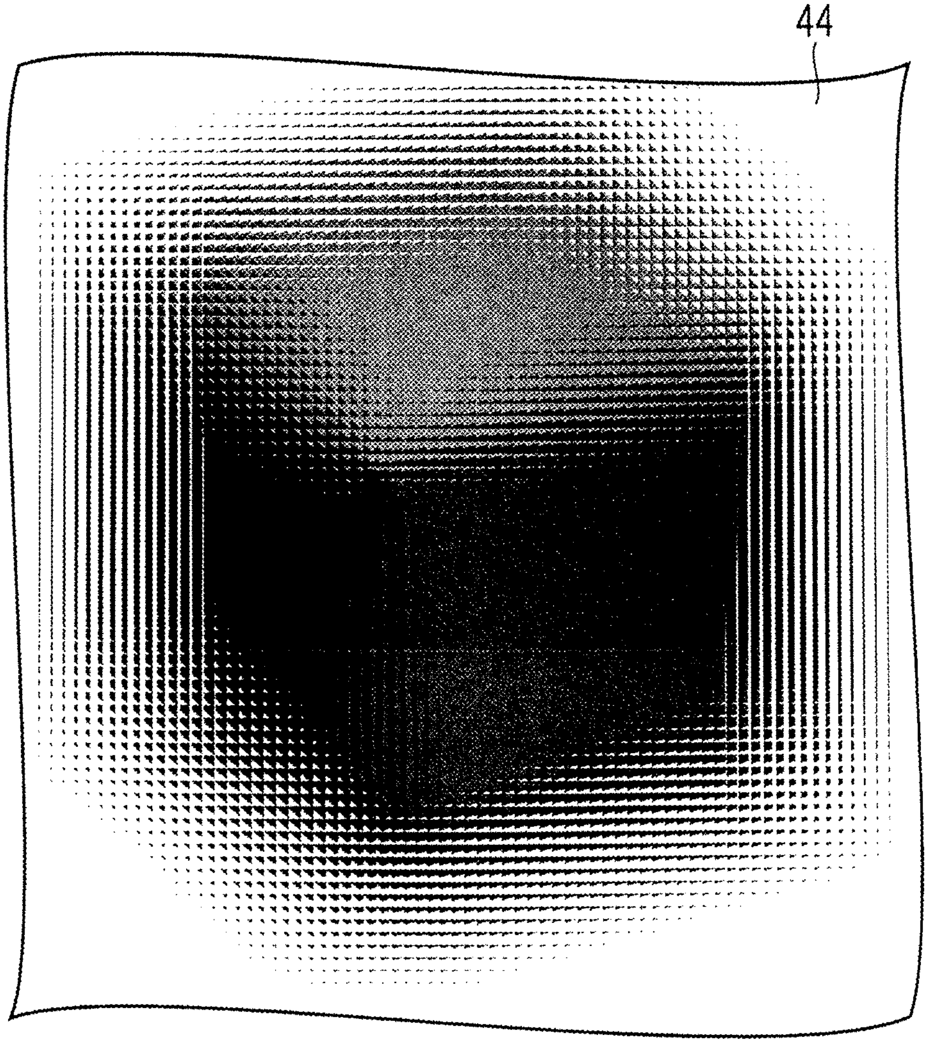

Shown are:

FIG. 1 a schematic diagram of a banknote having an embedded security thread and an affixed transfer element, FIG. 2 schematically, the layer structure of a security element according to the present invention, in cross section, FIG. 3 schematically, a side view in space of a solid that is to be depicted and that is to be depicted in perspective in a motif image plane, and FIG. 4 for the height profile model, in (a), a two-dimensional depiction f(x,y) of a cube to be depicted, in central projection, in (b), the associated height/depth information z(x,y) in gray encoding, and in (c), the image function m(x,y) calculated with the aid of these specifications.

The invention will now be explained using the example of security elements for banknotes. For this, FIG. 1 shows a schematic diagram of a banknote 10 that is provided with two security elements 12 and 16 according to exemplary embodiments of the present invention. The first security element constitutes a security thread 12 that emerges at certain window regions 14 at the surface of the banknote 10, while it is embedded in the interior of the banknote 10 in the regions lying therebetween. The second security element is formed by an affixed transfer element 16 of arbitrary shape. The security element 16 can also be developed in the form of a cover foil that is arranged over a window region or a through opening in the banknote. The security element can be designed for viewing in top view, looking through, or for viewing both in top view and looking through.

Both the security thread 12 and the transfer element 16 can include a modulo magnification arrangement according to an exemplary embodiment of the present invention. The operating principle and the inventive manufacturing method for such arrangements are described in greater detail in the following based on the transfer element 16.

For this, FIG. 2 shows, schematically, the layer structure of the transfer element 16, in cross section, with only the portions of the layer structure being depicted that are required to explain the functional principle. The transfer element 16 includes a substrate 20 in the form of a transparent plastic foil, in the exemplary embodiment a polyethylene terephthalate (PET) foil about 20 μm thick.

The top of the substrate foil 20 is provided with a grid-shaped arrangement of microlenses 22 that form, on the surface of the substrate foil, a two-dimensional Bravais lattice having a prechosen symmetry. The Bravais lattice can exhibit, for example, a hexagonal lattice symmetry. However, also other, especially lower, symmetries and thus more general shapes are possible, such as the symmetry of a parallelogram lattice.

The spacing of adjacent microlenses 22 is preferably chosen to be as small as possible in order to ensure as high an areal coverage as possible and thus a high-contrast depiction. The spherically or aspherically designed microlenses 22 preferably exhibit a diameter between 5 μm and 50 μm and especially a diameter between merely 10 μm and 35 μm and are thus not perceptible with the naked eye. It is understood that, in other designs, also larger or smaller dimensions may be used. For example, the microlenses in modulo magnification arrangements can exhibit, for decorative purposes, a diameter between 50 μm and 5 mm, while in modulo magnification arrangements that are to be decodable only with a magnifier or a microscope, also dimensions below 5 μm can be used.

On the bottom of the carrier foil 20 is arranged a motif layer 26 that includes a motif image, subdivided into a plurality of cells 24, having motif image elements 28.

The optical thickness of the substrate foil 20 and the focal length of the microlenses 22 are coordinated with each other such that the motif layer 26 is located approximately the lens focal length away. The substrate foil 20 thus forms an optical spacing layer that ensures a desired, constant separation of the microlenses 22 and the motif layer 26 having the motif image.

To explain the operating principle of the modulo magnification arrangements according to the present invention, FIG. 3 shows, highly schematically, a side view of a solid 30 in space that is to be depicted in perspective in the motif image plane 32, which in the following is also called the plane of projection.

Very generally, the solid 30 is described by a solid function f(x,y,z) and a transparency step function t(x,y,z), wherein the z-axis stands normal to the plane of projection 32 spanned by the x- and y-axis. The solid function f(x,y,z) indicates a characteristic property of the solid at the position (x,y,z), for example a brightness distribution, a color distribution, a binary distribution or also other solid properties, such as transparency, reflectivity, density or the like. Thus, in general, it can represent not only a scalar, but also a vector-valued function of the spatial coordinates x, y and z. The transparency step function t(x,y,z) is equal to 1 if, at the position (x,y,z), the solid covers the background, and otherwise, so especially if the solid is transparent or not present at the position (x,y,z), is equal to 0.

It is understood that the three-dimensional image to be depicted can comprise not only a single object, but also multiple three-dimensional objects that need not necessarily be related. The term "solid" used in the context of this description is used in the sense of an arbitrary three-dimensional pattern and includes patterns having one or more separate three-dimensional objects.

The arrangement of the microlenses in the lens plane 34 is described by a two-dimensional Bravais lattice whose unit cell is specified by vectors $w_1$ and $w_2$ (having the components $w_{11}$, $w_{21}$ and $w_{12}$, $w_{22}$). In compact notation, the unit cell can also be specified in matrix form by a lens grid matrix W:

$$W = (w_1, w_2) = \begin{pmatrix} w_{11} & w_{12} \\ w_{21} & w_{22} \end{pmatrix}.$$

In the following, the lens grid matrix W is also often simply called a lens matrix or lens grid. In place of the term lens plane, also the term pupil plane is used in the following. The positions $x_m$, $y_m$ in the pupil plane, referred to below as pupil positions, constitute the lattice points of the W lattice in the lens plane 34.

In the lens plane 34, in place of lenses 22, also, for example, circular apertures can be used, according to the principle of the pinhole camera.

Also all other types of lenses and imaging systems, such as aspherical lenses, cylindrical lenses, slit apertures, circular or slit apertures provided with reflectors, Fresnel lenses, GRIN lenses (Gradient Refractive Index), zone plates (diffraction lenses), holographic lenses, concave reflectors, Fresnel reflectors, zone reflectors and other elements having a focusing or also a masking effect, can be used as viewing elements in the viewing grid.

In principle, in addition to elements having a focusing effect, also elements having a masking effect (circular or slot apertures, also reflector surfaces behind circular or slot apertures) can be used as viewing elements in the viewing grid.

When a concave reflector array is used, and with other reflecting viewing grids used according to the present invention, the viewer looks through the in this case partially transmissive motif image at the reflector array lying therebehind and sees the individual small reflectors as light or dark points of which the image to be depicted is made up. Here, the motif image is generally so finely patterned that it can be seen only as a haze. The formulas described for the relationships between the image to be depicted and the motif image apply also when this is not specifically mentioned, not only for lens grids, but also for reflector grids. It is understood that, when concave reflectors are used according to the present invention, the reflector focal length takes the place of the lens focal length.

If, in place of a lens array, a reflector array is used according to the present invention, the viewing direction in FIG. 2 is to be thought from below, and in FIG. 3, the planes 32 and 34 in the reflector array arrangement are interchanged. The present invention is described based on lens grids, which stand representatively for all other viewing grids used according to the present invention.

With reference to FIG. 3 again, e denotes the lens focal length (in general, the effective distance e takes into account the lens data and the refractive index of the medium between the lens grid and the motif grid). A point $(x_K, y_K, z_K)$ of the solid 30 in space is illustrated in perspective in the plane of projection 32, with the pupil position $(x_m, y_m, 0)$.

The value $f(x_K, y_K, z_K(x,y,x_m,y_m))$ that can be seen in the solid is plotted at the position (x,y,e) in the plane of projection 32, wherein $(x_K, y_K, z_K(x,y,x_m,y_m))$ is the common point of the solid 30 having the characteristic function t(x,y,z) and line of sight $[(x_m, y_m, 0), (x, y, e)]$ having the smallest z-value. Here, any sign preceding z is taken into account such that the point having the most negative z-value is selected rather than the point having the smallest z-value in terms of absolute value.

If, initially, only a solid standing in space without movement effects is viewed upon tilting the magnification arrangement, then the motif image in the motif plane 32 that produces a depiction of the desired solid when viewed through the lens grid W arranged in the lens plane 34 is described by an image function m(x,y) that, according to the present invention, is given by:

$$f\begin{pmatrix} \begin{pmatrix} x \\ y \end{pmatrix} + \left(\frac{z_K(x, y, x_m, y_m)}{e} - 1\right) \cdot \left(\left(\begin{pmatrix} x \\ y \end{pmatrix} \bmod W\right) - W \cdot \begin{pmatrix} c_1 \\ c_2 \end{pmatrix}\right) \\ z_K(x, y, x_m, y_m) \end{pmatrix} = f\begin{pmatrix} x_K \\ y_K \\ z_K(x, y, x_m, y_m) \end{pmatrix},$$

wherein, for $z_K(x,y,x_m,y_m)$, the smallest value is to be taken for which $t(x,y,z_K)$ is not equal to 0.

Here, the vector $(c_1, c_2)$ that in the general case can be location dependent, in other words can be given by $(c_1(x,y), c_2(x,y))$, where $0 \le c_1(x,y), c_2(x,y) < 1$, indicates the relative position of the center of the viewing elements within the cells of the motif image.

The calculation of $z_K(x,y,x_m,y_m)$ is, in general, very complex since 10,000 to 1,000,000 and more positions $(x_m, y_m)$ in the lens raster image must be taken into account. Thus, some methods are listed below in which $z_K$ becomes independent from $(x_m, y_m)$ (height profile model) or even becomes independent from $(x,y,x_m,y_m)$ (section plane model).

First, however, another generalization of the above formula is presented in which not only solids standing in space are depicted, but rather in which the solid that appears in the lens grid device changes in depth when the viewing direction changes. For this, instead of the scalar magnification $v=z(x,y,x_m,y_m)/e$, a magnification and movement matrix $A(x,y,x_m,y_m)$ is used in which the term $v=z(x,y,x_m,y_m)/e$ is included.

Then $$f\left(\begin{pmatrix} \begin{pmatrix} x \\ y \end{pmatrix} + A((x,y,x_m,y_m) - I)\cdot\left(\left(\begin{pmatrix} x \\ y \end{pmatrix}\bmod W\right) - W\cdot\begin{pmatrix} c_1 \\ c_2 \end{pmatrix}\right) \\ z_K(x,y,x_m,y_m) \end{pmatrix}\right) = f\begin{pmatrix} x_K \\ y_K \\ z_K(x,y,x_m,y_m) \end{pmatrix}$$

results for the image function m(x,y). With $$a_{11}(x,y,x_m,y_m)=z_K(x,y,x_m,y_m)/e$$

the raster image arrangement represents the specified solid when the motif image is viewed with the eye separation being in the x-direction. If the raster image arrangement is to depict the specified solid when the motif image is viewed with the eye separation being in the direction $\psi$ to the x-axis, then the coefficients of A are chosen such that $$(a_{11}\cos^2\psi+(a_{12}+a_{21})\cos\psi\sin\psi+a_{22}\sin^2\psi)=z_K(x,y,x_m,y_m)/e$$

is fulfilled.

Height Profile Model

To simplify the calculation of the motif image, for the height profile, a two-dimensional drawing f(x,y) of a solid is assumed wherein, for each point x,y of the two-dimensional image of the solid, an additional z-coordinate z(x,y) indicates how far away, in the real solid, this point is located from the plane of projection 32. Here, z(x,y) can take on both positive and negative values.

For illustration, FIG. 4(*a*) shows a two-dimensional depiction 40 of a cube in central projection, a gray value f(x,y) being specified at every image point (x,y). In place of a central projection, also a parallel projection, which is particularly easy to produce, or another projection method can, of course, be used. The two-dimensional depiction f(x,y) can also be a fantasy image, it is important only that, in addition to the gray (or general color, transparency, reflectivity, density, etc.) information, height/depth information z(x,y) is allocated to every image point. Such a height depiction 42 is shown schematically in FIG. 4(*b*) in gray encoding, image points of the cube lying in front being depicted in white, and image points lying further back, in gray or black.

In the case of a pure magnification, for the image function, the specifications of f(x,y) and z(x,y) yield $$m(x,y) = f\left(\begin{pmatrix} x \\ y \end{pmatrix} + \left(\frac{z(x,y)}{e} - 1\right)\cdot\left(\left(\begin{pmatrix} x \\ y \end{pmatrix}\bmod W\right) - W\cdot\begin{pmatrix} c_1 \\ c_2 \end{pmatrix}\right)\right).$$

FIG. 4(*c*) shows the thus calculated image function m(x,y) of the motif image 44, which produces, given suitable scaling when viewed with a lens grid $$W = \begin{pmatrix} 2\text{ mm} & 0 \\ 0 & 2\text{ mm} \end{pmatrix},$$

the depiction of a three-dimensional-appearing cube behind the plane of projection.

If not only solids standing in space are to be depicted, but rather the solids appearing in the lens grid device are to change in depth when the viewing direction changes, then the magnification $v=z(x,y)/e$ is replaced by a magnification and movement matrix A(x,y):

$$m(x,y) = f\left(\begin{pmatrix} x \\ y \end{pmatrix} + (A(x,y) - 1)\cdot\left(\left(\begin{pmatrix} x \\ y \end{pmatrix}\bmod W\right) - W\cdot\begin{pmatrix} c_1 \\ c_2 \end{pmatrix}\right)\right),$$

the magnification and movement matrix A(x,y) being given, in the general case, by $$A(x,y) = \begin{pmatrix} a_{11}(x,y) & a_{12}(x,y) \\ a_{21}(x,y) & a_{22}(x,y) \end{pmatrix} = \begin{pmatrix} \frac{z_1(x,y)}{e} & \frac{z_2(x,y)}{e}\cdot\cos\phi_2(x,y) \\ \frac{z_1(x,y)}{e}\cdot\tan\phi_1(x,y) & \frac{z_2(x,y)}{e} \end{pmatrix}.$$

For illustration, some special cases are treated:

EXAMPLE 1

Two height functions $z_1(x,y)$ and $z_2(x,y)$ are specified such that the magnification and movement matrix A(x,y) acquires the form $$A(x,y) = \begin{pmatrix} \frac{z_1(x,y)}{e} & 0 \\ 0 & \frac{z_2(x,y)}{e} \end{pmatrix}.$$

Upon rotating the arrangement when viewing, the height functions $z_1(x,y)$ and $z_2(x,y)$ of the depicted solid transition into one another.

EXAMPLE 2

Two height functions $z_1(x,y)$ and $z_2(x,y)$ and two angles $\phi_1$ and $\phi_2$ are specified such that the magnification and movement matrix A(x,y) acquires the form $$A(x,y) = \begin{pmatrix} \frac{z_1(x,y)}{e} & \frac{z_2(x,y)}{e}\cdot\cot\phi_2 \\ \frac{z_1(x,y)}{e}\cdot\tan\phi_1 & \frac{z_2(x,y)}{e} \end{pmatrix}.$$

Upon rotating the arrangement when viewing, the height functions of the depicted solid transition into one another. The two angles $\phi_1$ and $\phi_2$ have the following significance:

Upon normal viewing (eye separation direction in the x-direction), the solid is seen in height relief $z_1(x,y)$, and upon tilting the arrangement in the x-direction, the solid moves in the direction $\phi_1$ to the x-axis.

Upon viewing at a 90° rotation (eye separation direction in the y-direction), the solid is seen in height relief $z_2(x,y)$, and upon tilting the arrangement in the y-direction, the solid moves in the direction $\phi_2$ to the x-axis.

EXAMPLE 3

A height function z(x,y) and an angle $\phi_1$ are specified such that the magnification and movement matrix A(x,y) acquires the form $$A(x, y) = \begin{pmatrix} \frac{z_1(x, y)}{e} & 0 \\ \frac{z_1(x, y)}{e} \cdot \tan\theta_1 & 1 \end{pmatrix}.$$

Upon normal viewing (eye separation direction in the x-direction) and tilting the arrangement in the x-direction, the solid moves in the direction $\phi_1$ to the x-axis. Upon tilting in the y-direction, no movement occurs.

In this exemplary embodiment, the viewing is also possible with a suitable cylindrical lens grid, for example with a slot grid or cylindrical lens grid whose unit cell is given by $$W = \begin{pmatrix} d & 0 \\ 0 & \infty \end{pmatrix}$$

where d is the slot or cylinder axis distance, or with a circular aperture array or lens array where $$W = \begin{pmatrix} d & 0 \\ d \cdot \tan\beta & d_2 \end{pmatrix},$$

where $d_2$, $\beta$ are arbitrary.

In a cylindrical lens axis in an arbitrary direction $\gamma$ and having an axis distance d, in other words a lens grid $$W = \begin{pmatrix} \cos\gamma & -\sin\gamma \\ \sin\gamma & \cos\gamma \end{pmatrix} \cdot \begin{pmatrix} d & 0 \\ 0 & \infty \end{pmatrix},$$

the suitable matrix is A, in which no magnification or distortion is present in the direction $\gamma$:

$$A = \begin{pmatrix} \cos\gamma & -\sin\gamma \\ \sin\gamma & \cos\gamma \end{pmatrix} \cdot \begin{pmatrix} \frac{z_1(x, y)}{e} & 0 \\ \frac{z_1(x, y)}{e} \cdot \tan\phi_1 & 1 \end{pmatrix} \cdot \begin{pmatrix} \cos\gamma & \sin\gamma \\ -\sin\gamma & \cos\gamma \end{pmatrix}.$$

The pattern produced herewith for the print or embossing image to be disposed behind a lens grid W can be viewed not only with the slot aperture array or cylindrical lens array having the axis in the direction $\gamma$, but also with a circular aperture array or lens array, where $$W = \begin{pmatrix} \cos\gamma & -\sin\gamma \\ \sin\gamma & \cos\gamma \end{pmatrix} \cdot \begin{pmatrix} d & 0 \\ d \cdot \tan\beta & d_2 \end{pmatrix},$$

$d_2$, $\beta$ being able to be arbitrary.

EXAMPLE 4

Two height functions $z_1(x,y)$ and $z_2(x,y)$ and an angle $\phi_2$ are specified such that the magnification and movement matrix A(x,y) acquires the form $$A(x, y) = \begin{pmatrix} 0 & \frac{z_2(x, y)}{e} \cdot \cot\phi_2 \\ \frac{z_1(x, y)}{e} & \frac{z_2(x, y)}{e} \end{pmatrix},$$

$$A(x, y) = \begin{pmatrix} 0 & \frac{z_2(x, y)}{e} \\ \frac{z_1(x, y)}{e} & 0 \end{pmatrix} \text{ if } \phi_2 = 0.$$

Upon rotating the arrangement when viewing, the height functions of the depicted solid transition into one another.

Further, the arrangement exhibits an orthoparallactic 3D effect wherein, upon usual viewing (eye separation direction in the x-direction) and upon tilting the arrangement in the x-direction, the solid moves normal to the x-axis.

Upon viewing at a 90° rotation (eye separation direction in the y-direction) and upon tilting the arrangement in the y-direction, the solid moves in the direction $\phi_2$ to the x-axis.

A three-dimensional effect comes about here upon usual viewing (eye separation direction in the x-direction) solely through movement.

Section Plane Model

In the section plane model, to simplify the calculation of the motif image, the three-dimensional solid is specified by n sections $f_j(x,y)$ and n transparency step functions $t_j(x,y)$, where j=1, . . . n, that each lie, for example, at a depth $z_j$, $z_j > z_{j-1}$, upon viewing with the eye separation being in the x-direction. The $A_j$-matrix must then be chosen such that the upper left coefficient is equal to $z_j/e$.

Here, $f_j(x,y)$ is the image function of the j-th section and can indicate a brightness distribution (grayscale image), a color distribution (color image), a binary distribution (line drawing) or also other image properties, such as transparency, reflectivity, density or the like. The transparency step function $t_j(x,y)$ is equal to 1 if, at the position (x,y), the section j covers objects lying behind it, and otherwise is equal to 0.

Then $$f_j\left(\begin{pmatrix} x \\ y \end{pmatrix} + (A_j - I) \cdot \left(\left(\begin{pmatrix} x \\ y \end{pmatrix} \bmod W\right) - W \cdot \begin{pmatrix} c_1 \\ c_2 \end{pmatrix}\right)\right)$$

results for the image function m(x,y), wherein j is the smallest index for which $$t_j\left(\begin{pmatrix} x \\ y \end{pmatrix} + (A_j - I) \cdot \left(\left(\begin{pmatrix} x \\ y \end{pmatrix} \bmod W\right) - W \cdot \begin{pmatrix} c_1 \\ c_2 \end{pmatrix}\right)\right)$$

is not equal to zero.

A woodcarving-like or copperplate-engraving-like 3D image is obtained if, for example, the sections $f_j$, $t_j$ are described by multiple function values in the following manner:

$f_j$=black-white value (or grayscale value) on the contour line or black-white values (or grayscale values) in differently extended regions of the sectional figure that adjoin at the edge, and $$t_j = \begin{cases} 1 & \text{Opacity (covering power) within the sectional figure of the solid} \\ 0 & \text{Opacity (covering power) outside the sectional figure of the solid} \end{cases}$$

To illustrate the section plane model, here, too, some special cases will be treated:

EXAMPLE 5

In the simplest case, the magnification and movement matrix is given by $$A_j = \begin{pmatrix} \frac{z_j}{e} & 0 \\ 0 & \frac{z_j}{e} \end{pmatrix} = \frac{z_j}{e} \cdot I = v_j \cdot I.$$

The depth remains unchanged for all viewing directions and all eye separation directions, and upon rotating the arrangement.

EXAMPLE 6

A change factor k not equal to 0 is specified such that the magnification and movement matrix $A_j$ acquires the form $$A_j = \begin{pmatrix} \frac{z_j}{e} & 0 \\ 0 & k \cdot \frac{z_j}{e} \end{pmatrix}.$$

Upon rotating the arrangement, the depth impression of the depicted solid changes by the change factor k.

EXAMPLE 7

A change factor k not equal to 0 and two angles $\phi_1$ and $\phi_2$ are specified such that the magnification and movement matrix $A_j$ acquires the form $$A_j = \begin{pmatrix} \frac{z_j}{e} & k \cdot \frac{z_j}{e} \cdot \cot\phi_2 \\ \frac{z_j}{e} \cdot \tan\phi_1 & k \cdot \frac{z_j}{e} \end{pmatrix}.$$

Upon normal viewing (eye separation direction in the x-direction) and tilting the arrangement in the x-direction, the solid moves in the direction $\phi_1$ to the x-axis, and upon viewing at a 90° rotation (eye separation direction in the y-direction) and tilting the arrangement in the y-direction, the solid moves in the direction $\phi_2$ to the x-axis and is stretched by the factor k in the depth dimension.

EXAMPLE 8

An angle $\phi_1$ is specified such that the magnification and movement matrix $A_j$ acquires the form $$A_j = \begin{pmatrix} \frac{z_j}{e} & 0 \\ \frac{z_j}{e} \cdot \tan\phi_1 & 1 \end{pmatrix}.$$

Upon normal viewing (eye separation direction in the x-direction) and tilting the arrangement in the x-direction, the solid moves in the direction $\phi_1$ to the x-axis. Upon tilting in the y-direction, no movement occurs.

In this exemplary embodiment, the viewing is also possible with a suitable cylindrical lens grid, for example with a slot grid or cylindrical lens grid whose unit cell is given by $$W = \begin{pmatrix} d & 0 \\ 0 & \infty \end{pmatrix}$$

where d is the slot or cylinder axis distance.

EXAMPLE 9

A change factor k not equal to 0 and an angle $\phi$ are specified such that the magnification and movement matrix $A_j$ acquires the form $$A_j = \begin{pmatrix} 0 & k \cdot \frac{z_j}{e} \cdot \cot\phi \\ \frac{z_j}{e} & k \cdot \frac{z_j}{e} \end{pmatrix},$$

$$A_j = \begin{pmatrix} 0 & k \cdot \frac{z_j}{e} \\ \frac{z_j}{e} & 0 \end{pmatrix} \text{ if } \phi = 0.$$

Upon horizontal tilting, the depicted solid tilts normal to the tilt direction, and upon vertical tilting, the solid tilts in the direction $\phi$ to the x-axis.

EXAMPLE 10

A change factor k not equal to 0 and an angle $\phi_1$ are specified such that the magnification and movement matrix $A_j$ acquires the form $$A_j = \begin{pmatrix} \frac{z_j}{e} & k \cdot \frac{z_j}{e} \cdot \cot\phi_1 \\ \frac{z_j}{e} \cdot \tan\phi_1 & k \cdot \frac{z_j}{e} \end{pmatrix}.$$

Irrespective of the tilt direction, the depicted solid always moves in the direction $\phi_1$ to the x-axis.

Combined Embodiments

In the following, further embodiments of the present invention are depicted that are each explained using the example of the height profile model, in which the solid that is to be depicted is depicted, in accordance with the above explanation, by a two-dimensional drawing f(x,y) and a height specification z(x,y). However, it is understood that the embodiments described below can also be used in the context of the general perspective and the section plane model, wherein the two-dimensional function f(x,y) is then replaced by the three-dimensional functions f(x,y,z) and t(x,y,z) or the sectional images $f_j(x,y)$ and $t_j(x,y)$.

For the height profile model, the image function m(x,y) is generally given by $$m(x,y)=f\begin{pmatrix}x_K\\y_K\end{pmatrix}\cdot g(x,y),\text{ where}$$

$$\begin{pmatrix}x_K\\y_K\end{pmatrix}=\begin{pmatrix}x\\y\end{pmatrix}+V(x,y)\cdot\left(\left(\left(\begin{pmatrix}x\\y\end{pmatrix}+w_d(x,y)\right)\bmod W\right)-w_d(x,y)-w_c(x,y)\right),$$

$$w_d(x,y)=W\cdot\begin{pmatrix}d_1(x,y)\\d_2(x,y)\end{pmatrix}\text{ and }w_c(x,y)=W\cdot\begin{pmatrix}c_1(x,y)\\c_2(x,y)\end{pmatrix}.$$

The magnification term V(x,y) is generally a matrix V(x,y)=(A(x,y)−I), the matrix $$A(x,y)=\begin{pmatrix}a_{11}(x,y)&a_{12}(x,y)\\a_{21}(x,y)&a_{22}(x,y)\end{pmatrix}$$

describing the desired magnification and movement behavior of the specified solid, and I being the identity matrix. In the special case of a pure magnification without movement effect, the magnification term is a scalar $$V(x,y)=\left(\frac{z(x,y)}{e}-1\right).$$

The vector $(c_1(x,y), c_2(x,y))$, where $0\le c_1(x,y), c_2(x,y)<1$, indicates the relative position of the center of the viewing elements within the cells of the motif image. The vector $(d_1(x,y), d_2(x,y))$, where $0\le d_1(x,y), d_2(x,y)<1$, represents a displacement of the cell boundaries in the motif image, and g(x,y) is a mask function for adjusting the visibility of the solid.

EXAMPLE 11

For some applications, an angle limit when viewing the motif images can be desired, i.e. the depicted three-dimensional image should not be visible from all directions, or even should be perceptible only in a small solid angle range.

Such an angle limit can be advantageous especially in combination with the alternating images described below, since the alternation from one motif to the other is generally not perceived by both eyes simultaneously. This can lead to an undesired double image being visible during the alternation as a superimposition of adjacent image motifs. However, if the individual images are bordered by an edge of suitable width, such a visually undesired superimposition can be suppressed.

Further, it has become evident that the imaging quality can possibly deteriorate considerably when the lens array is viewed obliquely from above: while a sharp image is perceptible when the arrangement is viewed vertically, in this case, the image becomes less sharp with increasing tilt angle and appears blurry. For this reason, an angle limit can also be advantageous for the depiction of individual images if it masks out especially the areal regions between the lenses that are probed by the lenses only at relatively high tilt angles. In this way, the three-dimensional image disappears for the viewer upon tilting before it can be perceived blurrily.

Such an angle limit can be achieved through a mask function g≠1 in the general formula for the motif image m(x,y). A simple example of such a mask function is $$g\begin{pmatrix}x\\y\end{pmatrix}=\begin{cases}1&\text{for }(x,y)\bmod W=t_1(w_{11},w_{21})+t_2(w_{12},w_{22})\\&\quad\text{where }k_{11}\le t_1\le k_{12}\text{ and }k_{21}\le t_2\le k_{22}\\0&\text{otherwise}\end{cases}$$

where $0<=k_{ij}<1$. In this way, only a section of the lattice cell $(w_{11}, w_{21})$, $(w_{12}, w_{22})$ is used, namely the region $k_{11}\cdot(w_{11}, w_{21})$ to $k_{12}\cdot(w_{11}, w_{21})$ in the direction of the first lattice vector and the region $k_{21}\cdot(w_{12}, w_{22})$ to $k_{22}\cdot(w_{12}, w_{22})$ in the direction of the second lattice vector. As the sum of the two edge regions, the width of the masked-out strips is $(k_{11}+(1-k_{12}))\cdot(w_{11}, w_{21})$ or $(k_{21}+(1-k_{22}))\cdot(w_{12}, w_{22})$.

It is understood that the function g(x,y) can, in general, specify the distribution of covered and uncovered areas within a cell arbitrarily.

In addition to an angle limit, mask functions can, as an image field limit, also define regions in which the three-dimensional image does not become visible. In this case, the regions in which g=0 can extend across a plurality of cells. For example, the embodiments cited below having adjacent images can be described by such macroscopic mask functions. Generally, a mask function for limiting the image field is given by $$g\begin{pmatrix}x\\y\end{pmatrix}=\begin{cases}1&\text{in regions in which the 3D image is to be visible}\\0&\text{in regions in which the 3D image is not to be visible}\end{cases}$$

When a mask function g≠1 is used, in the case of location-independent cell boundaries in the motif image, one obtains from the formula for the image function m(x,y):

$$m(x,y)=f\left(\begin{pmatrix}x\\y\end{pmatrix}+(A-I)\cdot\left(\left(\begin{pmatrix}x\\y\end{pmatrix}\bmod W\right)-W\cdot\begin{pmatrix}c_1\\c_2\end{pmatrix}\right)\right)\cdot g(x,y).$$

EXAMPLE 12

In the examples described thus far, the vector $(d_1(x,y), d_2(x,y))$ was identical to zero and the cell boundaries were distributed uniformly across the entire area. In some embodiments, however, it can also be advantageous to location-dependently displace the grid of the cells in the motif plane in order to achieve special optical effects upon changing the viewing direction. With g≡1, the image function m(x,y) is then represented in the form $$f\left(\begin{pmatrix}x\\y\end{pmatrix}+(A-I)\cdot\left(\left(\left(\begin{pmatrix}x\\y\end{pmatrix}+W\begin{pmatrix}d_1(x,y)\\d_2(x,y)\end{pmatrix}\right)\bmod W\right)-W\begin{pmatrix}d_1(x,y)\\d_2(x,y)\end{pmatrix}-W\cdot\begin{pmatrix}c_1\\c_2\end{pmatrix}\right)\right),$$

where $0\le d_1(x,y), d_2(x,y)<1$.

EXAMPLE 13

Also the vector $(c_1(x,y), c_2(x,y))$ can be a function of the location. With $g\equiv 1$, the image function $m(x,y)$ is then represented in the form $$f\left(\begin{pmatrix} x \\ y \end{pmatrix} + (A - I)\cdot\left(\left(\begin{pmatrix} x \\ y \end{pmatrix} \bmod W\right) - W\cdot\begin{pmatrix} c_1(x, y) \\ c_2(x, y) \end{pmatrix}\right)\right)$$

where $0\leq c_1(x,y), c_2(x,y)<1$. Here, too, of course, the vector $(d_1(x,y), d_2(x,y))$ can be not equal to zero and the movement matrix $A(x,y)$ location dependent such that, for $g\equiv 1$, $$f\left(\begin{pmatrix} x \\ y \end{pmatrix} + (A(x, y) - I)\cdot \left(\left(\left(\begin{pmatrix} x \\ y \end{pmatrix} + W\begin{pmatrix} d_1(x, y) \\ d_2(x, y) \end{pmatrix}\right) \bmod W\right) - W\begin{pmatrix} d_1(x, y) \\ d_2(x, y) \end{pmatrix} - W\cdot\begin{pmatrix} c_1(x, y) \\ c_2(x, y) \end{pmatrix}\right)\right)$$

generally results, where $0\leq c_1(x,y), c_2(x,y); d_1(x,y), d_2(x,y)<1$.

As explained above, the vector $(c_1(x,y), c_2(x,y))$ describes the position of the cells in the motif image plane relative to the lens array W, the grid of the lens centers being able to be viewed as the reference point set. If the vector $(c_1(x,y), c_2(x,y))$ is a function of the location, then this means that changes from $(c_1(x,y), c_2(x,y))$ manifest themselves in a change in the relative positioning between the cells in the motif image plane and the lenses, which leads to fluctuations in the periodicity of the motif image elements.

For example, a location dependence of the vector $(c_1(x,y), c_2(x,y))$ can advantageously be used if a foil web is used that, on the front, bears a lens embossing having a contiguously homogeneous grid W. If a modulo magnification arrangement having location-independent $(c_1(x,y), c_2(x,y))$ is embossed on the reverse, then it is left to chance which features are perceived from which viewing angles if no exact registration is possible between the front and reverse embossing. If, on the other hand, $(c_1(x,y), c_2(x,y))$ is varied transverse to the foil running direction, then a strip-shaped region that fulfills the required positioning between the front and reverse embossing is found in the running direction of the foil.

Furthermore, $(c_1(x,y), c_2(x,y))$ can, for example, also be varied in the running direction of the foil in order to find, in every strip in the longitudinal direction of the foil, sections that exhibit the correct register. In this way, it can be prevented that metalized hologram strips or security threads look different from banknote to banknote.

EXAMPLE 14

In a further exemplary embodiment, the three-dimensional image is to be visible not only when viewed through a normal circular/lens grid, but also when viewed through a slot grid or cylindrical lens grid, with especially a non-periodically-repeating individual image being able to be specified as the three-dimensional image.

This case, too, can be described by the general formula for $m(x,y)$, wherein, if the motif image to be applied is not transformed in the slot/cylinder direction with respect to the image to be depicted, a special matrix A is required that can be determined as follows:

If the cylinder axis direction lies in the y-direction and if the cylinder axis distance is d, then the slot or cylindrical lens grid is described by:

$$W = \begin{pmatrix} d & 0 \\ 0 & \infty \end{pmatrix}.$$

The suitable matrix A, in which no magnification or distortion is present in the y-direction, is then:

$$A = \begin{pmatrix} a_{11} & 0 \\ a_{21} & 1 \end{pmatrix} = \begin{pmatrix} v_1\cdot\cos\phi_1 & 0 \\ v_1\cdot\sin\phi_1 & 1 \end{pmatrix} = \begin{pmatrix} \frac{z_1}{e} & 0 \\ \frac{z_1}{e}\cdot\tan\phi_1 & 1 \end{pmatrix}.$$

Here, in the relationship $(A-I)W$, the matrix $(A-I)$ operates only on the first row of W such that W can represent an infinitely long cylinder.

The motif image to be applied, having the cylinder axis in the y-direction, then results in:

$$f\left(\begin{pmatrix} x \\ y \end{pmatrix} + \begin{pmatrix} a_{11}-1 & 0 \\ a_{21} & 0 \end{pmatrix}\cdot\left(\left(\begin{pmatrix} x \\ y \end{pmatrix} \bmod W\right) - W\cdot\begin{pmatrix} c_1 \\ c_2 \end{pmatrix}\right)\right) = f\left(\begin{matrix} x + (a_{11}-1)\cdot((x \bmod d) - d\cdot c_1) \\ y + a_{21}\cdot((x \bmod d) - d\cdot c_1) \end{matrix}\right)$$

wherein it is also possible that the support of $$f\left(\begin{pmatrix} a_{11}-1 & 0 \\ a_{21} & 0 \end{pmatrix}\cdot\begin{pmatrix} x \\ y \end{pmatrix}\right)$$

does not fit in a cell W, and is so large that the pattern to be applied displays no complete continuous images in the cells. The pattern produced in this way permits viewing not only with the slot aperture array or cylindrical lens array $$W = \begin{pmatrix} d & 0 \\ 0 & \infty \end{pmatrix},$$

but also with a circular aperture array or lens array, where $$W = \begin{pmatrix} d & 0 \\ d\cdot\tan\beta & d_2 \end{pmatrix},$$

$d_2$ and $\beta$ being arbitrary.

Combined Embodiments for Depicting Multiple Solids

In the previous explanations, the modulo magnification arrangement usually depicts an individual three-dimensional image (solid) when viewed. However, the present invention also comprises designs in which multiple three-dimensional images are depicted simultaneously or in alternation. In simultaneous depiction, the three-dimensional images can especially exhibit different movement behaviors upon tilting the arrangement. For three-dimensional images depicted in alternation, they can especially transition into one another upon tilting the arrangement. The different images can be independent of one another or related to one another as regards content, and depict, for example, a motion sequence.

Here, too, the principle is explained using the example of the height profile model, it again being understood that the described embodiments can, given appropriate adjustment or replacement of the functions $f_i(x,y)$, also be used in the context of the general perspective with solid functions $f_i(x,y,z)$ and transparency step functions $t_i(x,y,z)$, or in the context of the section plane model with sectional images $f_{ij}(x,y)$ and transparency step functions $t_{ij}(x,y)$.

A plurality N≥1 of specified three-dimensional solids are to be depicted that are given by height profiles having two-dimensional depictions of the solids $f_i(x,y)$, i=1, 2, . . . N and by height functions $z_i(x,y)$ that each include height/depth information for every point (x,y) of the specified solid $f_i$. For the height profile model, the image function m(x,y) is then generally given by $m(x,y)=F(h_i, h_2, \ldots h_N)$, having the describing functions $$h_i(x, y) = f_i\begin{pmatrix} x_{iK} \\ y_{iK} \end{pmatrix} \cdot g_i(x, y),$$

where $$\begin{pmatrix} x_{iK} \\ y_{iK} \end{pmatrix} = \begin{pmatrix} x \\ y \end{pmatrix} + V_i(x, y) \cdot \left( \left( \left( \begin{pmatrix} x \\ y \end{pmatrix} + w_{di}(x, y) \right) \text{mod} W \right) - w_{di}(x, y) - w_{ci}(x, y) \right),$$

$$w_{di} = (x, y) = W \cdot \begin{pmatrix} d_{i1}(x, y) \\ d_{i2}(x, y) \end{pmatrix} \text{ and } w_{ci}(x, y) = W \cdot \begin{pmatrix} c_{i1}(x, y) \\ c_{i2}(x, y) \end{pmatrix}.$$

Here, $F(h_i, h_2, \ldots h_N)$ is a master function that indicates an operation on the N describing functions $h_i(x,y)$. The magnification terms $V_i(x,y)$ are either scalars $$V_i(x, y) = \left( \frac{z_i(x, y)}{e} - 1 \right),$$

where e is the effective distance of the viewing grid from the motif image, or matrices $V_i(x,y)=(A_i(x,y)-I)$, the matrices $$A_i(x, y) = \begin{pmatrix} a_{i11}(x, y) & a_{i12}(x, y) \\ a_{i21}(x, y) & a_{i22}(x, y) \end{pmatrix}$$

each describing the desired magnification and movement behavior of the specified solid $f_i$ and I being the identity matrix. The vectors $(c_{i1}(x,y), c_{i2}(x,y))$, where $0 \leq c_{i1}(x,y)$, $c_{i2}(x,y) < 1$, indicate in each case, for the solid $f_i$, the relative position of the center of the viewing elements within the cells i of the motif image. The vectors $(d_{i1}(x,y), d_{i2}(x,y))$, where $0 \leq d_{i1}(x,y)$, $d_{i2}(x,y) < 1$, each represent a displacement of the cell boundaries in the motif image, and $g_i(x,y)$ are mask functions for adjusting the visibility of the solid $f_i$.

EXAMPLE 14

A simple example for designs having multiple three-dimensional images (solids) is a simple tilt image in which two three-dimensional solids $f_1(x,y)$ and $f_2(x,y)$ alternate as soon as the security element is tilted appropriately. At which viewing angles the alternation between the two solids takes place is defined by the mask functions $g_1$ and $g_2$. To prevent both images from being visible simultaneously—even when viewed with only one eye—the supports of the functions $g_1$ and $g_2$ are chosen to be disjoint.

The sum function is chosen as the master function F. In this way, for the image function of the motif image m(x,y), $$\left(f_1\left(\begin{pmatrix} x \\ y \end{pmatrix} + (A_1 - I) \cdot \left( \left( \begin{pmatrix} x \\ y \end{pmatrix} \text{mod} W \right) - W \cdot \begin{pmatrix} c_1 \\ c_2 \end{pmatrix} \right)\right)\right) \cdot \left(g_1\left(\begin{pmatrix} x \\ y \end{pmatrix}\right)\right) + +$$
$$\left(f_2\left(\begin{pmatrix} x \\ y \end{pmatrix} + (A_2 - I) \cdot \left( \left( \begin{pmatrix} x \\ y \end{pmatrix} \text{mod} W \right) - W \cdot \begin{pmatrix} c_1 \\ c_2 \end{pmatrix} \right)\right)\right) \cdot \left(g_2\left(\begin{pmatrix} x \\ y \end{pmatrix}\right)\right)$$

results, wherein, for a checkerboard-like alternation of the visibility of the two images, $$g_1\begin{pmatrix} x \\ y \end{pmatrix} = \begin{bmatrix} 1 & \text{for } (x, y)\text{mod}W = t_1(w_{11}, w_{21}) + t_2(w_{12}, w_{22}) \\ & \text{where } 0 \leq t_1, t_2 < 0.5 \text{ or } 0.5 \leq t_1, t_2 < 1 \\ 0 & \text{otherwise} \end{bmatrix}$$

$$g_2\begin{pmatrix} x \\ y \end{pmatrix} = \begin{bmatrix} 0 & \text{for } (x, y)\text{mod}W = t_1(w_{11}, w_{21}) + t_2(w_{12}, w_{22}) \\ & \text{where } 0 \leq t_1, t_2 < 0.5 \text{ or } 0.5 \leq t_1, t_2 < 1 \\ 1 & \text{otherwise} \end{bmatrix}$$

$$g_2\begin{pmatrix} x \\ y \end{pmatrix} = 1 - g_1\begin{pmatrix} x \\ y \end{pmatrix}$$

is chosen. In this example, the boundaries between the image regions in the motif image were chosen at 0.5 such that the areal sections belonging to the two images $f_i$ and $f_2$ are of equal size. Of course the boundaries can, in the general case, be chosen arbitrarily. The position of the boundaries determines the solid angle ranges from which the two three-dimensional images are visible.

Instead of checkerboard-like, the depicted images can also alternate stripwise, for example through the use of the following mask functions:

$$g_1\begin{pmatrix} x \\ y \end{pmatrix} = \begin{bmatrix} 1 & \text{for } (x, y)\text{mod}W = t_1(w_{11}, w_{21}) + t_2(w_{12}, w_{22}) \\ & \text{where } 0 \leq t_1 < 0.5 \text{ or } t_2 \text{ is arbitrary} \\ 0 & \text{otherwise} \end{bmatrix}$$

$$g_2\begin{pmatrix} x \\ y \end{pmatrix} = \begin{bmatrix} 0 & \text{for } (x, y)\text{mod}W = t_1(w_{11}, w_{21}) + t_2(w_{12}, w_{22}) \\ & \text{where } 0 \leq t_1 < 0.5 \text{ or } t_2 \text{ is arbitrary} \\ 1 & \text{otherwise} \end{bmatrix}$$

In this case, an alternation of the image information occurs if the security element is tilted along the direction indicated by the vector $(w_{11}, w_{21})$, while tilting along the second vector $(w_{12}, w_{22})$, in contrast, leads to no image alternation. Here, too, the boundary was chosen at 0.5, i.e. the area of the motif image was subdivided into strips of the same width that alternatingly include the pieces of information of the two three-dimensional images.

If the strip boundaries lie exactly under the lens center points or the lens boundaries, then the solid angle ranges at which the two images are visible are distributed equally: beginning with the vertical top view, viewed from the right half of the hemisphere, first one of the two three-dimensional images is seen, and from the left half of the hemisphere, first the other three-dimensional image. In general, the boundary between the strips can, of course, be laid arbitrarily.

EXAMPLE 15

In the modulo morphing or modulo cinema now described, the different three-dimensional images are directly associated in meaning, in the case of the modulo morphing, a start image morphing over a defined number of intermediate stages into an end image, and in the modulo cinema, simple motion sequences preferably being shown.

Let the three-dimensional images be given in the height profile model by images $$f_1\begin{pmatrix} x \\ y \end{pmatrix}, f_2\begin{pmatrix} x \\ y \end{pmatrix} \dots f_n\begin{pmatrix} x \\ y \end{pmatrix}$$

and $z_1(x,y) \dots z_n(x,y)$ that, upon tilting along the direction specified by the vector $(w_{11}, w_{21})$ are to appear in succession. To achieve this, a subdivision into strips of equal width is carried out with the aid of the mask functions $g_i$. If here, too, $w_{di}=0$ is chosen for i=1 . . . n and the sum function used as the master function F, then, for the image function of the motif image, $$m(x, y) = \sum_{i=1}^{n} \left( \left( f_i\left( \begin{pmatrix} x \\ y \end{pmatrix} + (A_i - I) \cdot \left( \begin{pmatrix} x \\ y \end{pmatrix} \text{mod} W - W \cdot \begin{pmatrix} c_1 \\ c_2 \end{pmatrix} \right) \right) \right) \cdot g_i\begin{pmatrix} x \\ y \end{pmatrix} \right)$$

$$g_i\begin{pmatrix} x \\ y \end{pmatrix} = \begin{cases} 1 & \text{for } (x, y)\text{mod}W = t_1(w_{11}, w_{21}) + t_2(w_{12}, w_{22}) \text{ where } \frac{i-1}{n} \le t_1 < \frac{i}{n} \text{ and } t_2 \text{ is arbitrary} \\ 0 & \text{otherwise} \end{cases}$$

results. Generalized, here, too, instead of the regular subdivision expressed in the formula, the strip width can be chosen to be irregular. It is indeed expedient to call up the image sequence by tilting along one direction (linear tilt movement), but this is not absolutely mandatory. Instead, the morph or movement effects can, for example, also be played back through meander-shaped or spiral-shaped tilt movements.

EXAMPLE 16

In examples 14 and 15, the goal was principally to always allow only a single three-dimensional image to be perceived from a certain viewing direction, but not two or more simultaneously. However, within the scope of the present invention, the simultaneous visibility of multiple images is likewise possible and can lead to attractive optical effects. Here, the different three-dimensional images $f_i$ can be treated completely independently from one another. This applies to both the image contents in each case and to the apparent position of the depicted objects and their movement in space.

While the image contents can be rendered with the aid of drawings, position and movement of the depicted objects are described in the dimensions of the space with the aid of the movement matrices $A_i$. Also the relative phase of the individual depicted images can be adjusted individually, as expressed by the coefficients $c_{ij}$ in the general formula for m(x,y). The relative phase controls at which viewing directions the motifs are perceptible. If, for the sake of simplicity, the unit function is chosen in each case for the mask functions $g_i$, if the cell boundaries in the motif image are not displaced location dependently, and if the sum function is chosen as the master function F, then, for a series of stacked three-dimensional images $f_i$:

$$m(x, y) = \sum_i \left( f_i\left( \begin{pmatrix} x \\ y \end{pmatrix} + (A_i - I) \cdot \left( \begin{pmatrix} x \\ y \end{pmatrix} \text{mod} W - W \cdot \begin{pmatrix} c_{i1} \\ c_{i2} \end{pmatrix} \right) \right) \right)$$

results.

In the superimposition of multiple images, the use of the sum function as the master function corresponds, depending on the character of the image function f, to an addition of the gray, color, transparency or density values, the resulting image values typically being set to the maximum value when the maximum value range is exceeded.

However, it can also be more favorable to choose other functions than the sum function for the master function F, for example an OR function, an exclusive or (XOR) function or the maximum function. Further possibilities consist in choosing the signal having the lowest function value, or as above, forming the sum of all function values that meet at a certain point. If there is a maximum upper limit, for example the maximum exposure intensity of a laser exposure device, then the sum can be cut off at this maximum value.

Through suitable visibility functions, blending and superimposition of multiple images, also e.g. "3D X-ray images" can be depicted, an "outer skin" and an "inner skeleton" being blended and superimposed.

EXAMPLE 17

All embodiments discussed in the context of this description can also be arranged adjacent to one another or nested within one another, for example as alternating images or as stacked images. Here, the boundaries between the image portions need not run in a straight line, but rather can be designed arbitrarily. In particular, the boundaries can be chosen such that they depict the contour lines of symbols or lettering, patterns, shapes of any kind, plants, animals or people.

In preferred embodiments, the image portions that are arranged adjacent to or nested within one another are viewed with a uniform lens array. In addition, also the magnification and movement matrix A of the different image portions can differ in order to facilitate, for example, special movement effects of the individual magnified motifs. It can be advantageous to control the phase relationship between the image portions so that the magnified motifs appear in a defined separation to one another.

Developments for all Embodiments

With the aid of the above-described formulas for the motif image m(x,y), it is possible to calculate the micropattern plane such that, when viewed with the aid of a lens grid, it renders a three-dimensional-appearing object. In principle, this is based on the fact that the magnification factor is location dependent, so the motif fragments in the different cells can also exhibit different sizes.

It is possible to intensify this three-dimensional impression by filling areas of different slopes with blaze lattices (sawtooth lattices) whose parameters differ from one another. Here, a blaze lattice is defined by indicating the parameters azimuth angle Φ, period d and slope α.

This can be explained graphically using so-called Fresnel patterns: The reflection of the impinging light at the surface of the pattern is decisive for the optical appearance of a three-dimensional pattern. Since the volume of the solid is not crucial for this effect, it can be eliminated with the aid of a simple algorithm. Here, round areas can be approximated by a plurality of small planar areas.

In eliminating the volume, care must be taken that the depth of the patterns lies in a range that is accessible with the aid of the intended manufacturing processes and within the focus range of the lenses. Furthermore, it can be advantageous if the period d of the sawteeth is large enough to largely avoid the creation of colored-appearing diffraction effects.

This development of the present invention is thus based on combining two methods for producing three-dimensional-seeming patterns: location-dependent magnification factor and filling with Fresnel patterns, blaze lattices or other optically effective patterns, such as subwavelength patterns.

In calculating a point in the micropattern plane, not only the value of the height profile at this position is taken into account (which is incorporated in the magnification at this position), but also optical properties at this position. In contrast to the cases discussed so far in which also binary patterns in the micropattern plane sufficed, in order to realize this development of the present invention, a three-dimensional patterning of the micropattern plane is required.

EXAMPLE

Three-Sided Pyramid

Due to the location-dependent magnification, different sized fragments of the three-sided pyramid are accommodated in the cells of the micropattern plane. To each of the three sides is allocated a blaze lattice that differ with respect to its azimuth angle. In the case of a straight equilateral pyramid, the azimuth angles are 0°, 120° and 240°. All areal regions that depict side 1 of the pyramid are furnished with the blaze lattice having azimuth 0°—irrespective of its size defined by the location-dependent A-matrix. The procedure is applied accordingly with sides 2 and 3 of the pyramid: they are filled with blaze lattices having azimuth angles 120° (side 2) and 240° (side 3). Through vapor deposition with metal (e.g. 50 nm aluminum) of the three-dimensional micropattern plane created in this way, the reflectivity of the surface is increased and the 3D effect further amplified.

A further possibility consists in the use of light absorbing patterns. In place of blaze lattices, also patterns can be used that not only reflect light, but that also absorb it to a high degree. This is normally the case when the depth/width aspect ratio (period or quasiperiod) is relatively high, for example 1/1 or 2/1 or higher. The period or quasiperiod can extend from the range of subwavelength patterns up to micropatterns—this also depends on the size of the cells. How dark an area is to appear can be controlled, for example, via the areal density of the patterns or the aspect ratio. Areas of differing slope can be allocated to patterns having absorption properties of differing intensity.

Lastly, a generalization of the modulo magnification arrangement is mentioned in which the lens elements (or the viewing elements in general) need not be arranged in the form of a regular lattice, but rather can be distributed arbitrarily in space with differing spacing. The motif image designed for viewing with such a general viewing element arrangement can then no longer be described in modulo notation, but is unambiguously defined by the following relationship $$m(x, y) = \sum_{w \in W} \chi_{M(w)}(x, y) \cdot (f_2 \cdot p_w^{-1})(x, y, \min\langle p_w(f_1^{-1}(1)) \cap pr_{XY}^{-1}(x, y), e_Z\rangle).$$

Here, $pr_{XY}$: $R^3 \rightarrow R^2$, $pr_{XY}(x, y, z) = (x, y)$ is the projection on the XY plane, $\langle a,b \rangle$ represents the scalar product, where $\langle (x, y, z), e_Z \rangle$, the scalar product of (x, y, z) with $e_Z = (0, 0, 1)$ yields the z component, and the set notation $\langle A,x \rangle = \{\langle a,x \rangle \mid a \in A\}$ was introduced for abbreviation. Further, the characteristic function is used that, for a set A, is given by $$\chi_A(x) = \begin{cases} 1 & \text{if } x \in A \\ 0 & \text{otherwise} \end{cases}$$

and the circular grid or lens grid $W = \{w_1, w_2, w_3, \ldots\}$ is given by an arbitrary discrete subset of $R^3$.

The perspective mapping to the grid point $w_m = (x_m, y_m, z_m)$ is given by $p_{wm}$: $R^3 \rightarrow R^3$, $$p_{wm}(x,y,z) = ((z_m x - x_m z)/(z_m - z), (z_m y - y_m z)/(z_m - z), (z_m z)/(z_m - z))$$

A subset M(w) of the plane of projection is allocated to each grid point $w \in W$. Here, for different grid points, the associated subsets are assumed to be disjoint.

Let the solid K to be modeled be defined by the function $f = (f_1, f_2)$: $R^3 \rightarrow R^2$, wherein $$f_1(x, y, z) = \begin{cases} 1 & \text{if } x \in K \\ 0 & \text{otherwise} \end{cases}$$

$f_2(x, y, z)$=is the brightness of the solid K at the position (x,y,z).

Then the above-mentioned formula can be understood as follows:

$$\underbrace{\sum_{w \in W} \underbrace{\chi_{M(w)}(x, y)}_{\substack{1, if\ (x,y)\ in \\ image\ cell\ of\ w}} \cdot (f_2 \cdot p_w^{-1})\left(x, y, \underbrace{\min\left\langle \underbrace{\underbrace{p_w(\underbrace{f_1^{-1}(1)}_{Solid})}_{\substack{Perspective\ image \\ of\ the\ solid}} \cap pr_{XY}^{-1}(x, y)}_{\substack{Perspective\ image\ of\ the\ solid \\ intersected\ with\ the\ vertical \\ straight\ line\ over\ (x,y)}}, e_Z \right\rangle}_{\substack{Minimun\ z\text{-}value, so\ the\ front\ edge\ of\ the \\ perspective\ image\ of\ the\ solid}}\right)}_{Brightness\ at\ the\ front\ edge\ of\ the\ solid}$$

The invention claimed is:

1. A security element for security papers, value documents, or other non-transitory data carriers, the security element comprising:

(A) a motif layer including a motif image that is subdivided into a plurality of cells, in each of which are arranged imaged regions of a specified three dimensional solid defined by a solid function f(x,y,z), the image regions of the specified three dimensional solid being arranged via printing, embossing, disposing, or a combination thereof, on or in at least one of the security papers, value documents, or other non-transitory data carriers, (B) a viewing grid composed of a plurality of viewing elements for depicting the specified three dimensional solid when the motif image is viewed with the aid of the viewing grid, the motif image having an image function m(x,y) that is given by $$m(x, y) = f\begin{pmatrix} x_K \\ y_K \\ z_K(x, y, x_m, y_m) \end{pmatrix} \cdot g(x, y),$$

where $$\begin{pmatrix} x_K \\ y_K \end{pmatrix} = \begin{pmatrix} x \\ y \end{pmatrix} + V(x, y, x_m, y_m) \cdot \left( \left( \left( \begin{pmatrix} x \\ y \end{pmatrix} + w_d(x, y) \right) \bmod W \right) - w_d(x, y) - w_c(x, y) \right)$$

$$w_d = (x, y) = W \cdot \begin{pmatrix} d_1(x, y) \\ d_2(x, y) \end{pmatrix} \text{ and } w_c(x, y) = W \cdot \begin{pmatrix} c_1(x, y) \\ c_2(x, y) \end{pmatrix},$$

such that the specified three dimensional solid defined is depicted when the motif image of the motif layer is viewed through the viewing grid;

wherein a unit cell of the viewing grid is described by lattice cell vectors $$w_1 = \begin{pmatrix} w_{11} \\ w_{21} \end{pmatrix} \text{ and } w_2 = \begin{pmatrix} w_{11} \\ w_{21} \end{pmatrix}$$

and combined in the matrix $$W = \begin{pmatrix} w_{11} & w_{12} \\ w_{21} & w_{22} \end{pmatrix},$$

and $x_m$ and $y_m$ indicate lattice points of the W-lattice, the magnification term $V(x,y, x_m,y_m)$ is either a scalar $$V(x, y, x_m, y_m) = \left( \frac{z_K(x, y, x_m, y_m)}{e} - 1 \right),$$

where e is the effective distance of the viewing grid from the motif image, or a matrix $V(x,y, x_m,y_m)=(A(x,y, x_m,y_m)-I)$, the matrix $$A(x, y, x_m, y_m) = \begin{pmatrix} a_{11}(x, y, x_m, y_m) & a_{12}(x, y, x_m, y_m) \\ a_{21}(x, y, x_m, y_m) & a_{22}(x, y, x_m, y_m) \end{pmatrix}$$

describing a desired magnification and movement behavior for the specified three dimensional solid and I being the identity matrix, the vector $(c_1(x,y), c_2(x,y))$, where $0 \leq c_1(x, y), c_2(x, y) < 1$, indicates a position of a center of the viewing elements relative to the cells of the motif image, the vector $(d_1(x,y), d_2(x,y))$, where $0 \leq d_1(x, y), d_2 (x, y) < 1$, represents a displacement of cell boundaries in the motif image, and g(x,y) is a mask function for adjusting visibility of the specified three dimensional solid.

2. The security element according to claim 1, characterized in that the magnification term is given by a matrix $V(x,y, x_m,y_m)=(A(x,y, x_m,y_m)-I)$, where $a_{11}(x,y, x_m,y_m)=z_K(x,y, x_m,y_m)/e$, such that the specified three dimensional solid is depicted when the motif image is viewed with an eye separation being in the x-direction.

3. The security element according to claim 1, characterized in that the magnification term is given by a matrix $V(x,y, x_m,y_m)=(A(x,y, x_m,y_m)-I)$, where $(a_{11} \cos^2(\Psi)+(a_{12}+a_{21})\cos(\Psi)\sin(\Psi)+a_{22} \sin^2(\Psi))=z_K(x, y, xm, ym)/e$ such that the specified three dimensional solid is depicted when the motif image is viewed with an eye separation being in the direction Ψ to the x-axis.

4. The security element according to claim 1, characterized in that, in addition to the solid function f(x,y,z), a transparency step function t(x,y,z) is given, wherein t(x,y,z) is equal to 1 if, at the position (x,y,z), the specified three dimensional solid f(x,y,z) covers the background, and otherwise is equal to 0, and wherein, for a viewing direction substantially in the direction of the z-axis, for $z_K(x,y,x_m,y_m)$, the smallest value is to be taken for which $t(x,y,z_K)$ is not equal to zero in order to view a front of the specified three dimensional solid from the outside, and wherein, for the viewing direction substantially in the direction of the z-axis, for $z_K(x,y,x_m,y_m)$, the largest value is to be taken for which $t(x,y,z_K)$ is not equal to zero in order to view a back of the three dimensional solid from the inside.

5. The security element according to claim 1, characterized in that the cell boundaries in the motif image are location-dependently displaced, preferably in that the motif image exhibits two or more subregions having a different, in each case constant, cell grid.

6. The security element according to claim 1, characterized in that the mask function g is identical to 1.

7. The security element according to claim 1, characterized in that the mask function g is zero in subregions, especially in edge regions of the cells of the motif image, and in this way limits the solid angel range at which the depicted three dimensional solid is visible.

8. The security element according to claim 1, characterized in that the relative position of the center of the viewing elements is location independent within the cells of the motif image, in other words the vector $(c_1, c_2)$ is constant.

9. The security element according to claim 1, characterized in that the relative position of the center of the viewing elements is location dependent within the cells of the motif image.

10. The security element according to claim 1, characterized in that the viewing grid and the motif layer are firmly joined together to form the security element having a stacked, spaced-apart viewing grid and motif layer.

11. The security element according to claim 10, characterized in that the motif layer and the viewing grid are arranged at opposing surfaces of an optical spacing layer.

12. The security element according to claim 10, characterized in that the security element is a security thread, a tear strip, a security band, a security strip, a patch or a label for application to a security paper, value document or the like.

13. The security element according to claim 10, characterized in that the total thickness of the security element is below 50 μm, preferably below 30 μm and particularly preferably below 20 μm.

14. The security element according to claim 1, characterized in that the viewing grid and the motif layer are arranged at different positions of a non-transitory data carrier such that the viewing grid and the motif layer are stackable for self-authentication and form the security element in the stacked state.

15. The security element according to claim 14, characterized in that the viewing grid and the motif layer are stackable by bending, creasing, buckling or folding the non-transitory data carrier.

16. The security element according to claim 1, characterized in that, to amplify the three-dimensional visual impression, the motif layer is filled with Fresnel patterns, blaze lattices or other optically effective patterns, such as subwavelength patterns.

17. The security element according to claim 1, characterized in that image contents of the motif image within individual cells of the motif layer are interchanged according to the determination of the image function m(x,y).

18. A security paper for manufacturing security or value documents, such as banknotes, checks, identification cards, certificates or the like, having a security element according to claim 1.

19. A non-transitory data carrier, especially a branded article, value document, decorative article or the like, having a security element according to claim 1.

20. The non-transitory data carrier according to claim 19, characterized in that the viewing grid and/or the motif layer of the security element is arranged in a window region of the non-transitory data carrier.

21. A security element for security papers, value documents, or other non-transitory data carriers, the security element comprising:

(A) a motif layer including a motif image that is subdivided into a plurality of cells, in each of which are arranged imaged regions of a specified three dimensional solid given by a height profile having a two dimensional depiction of the solid f(x,y) and a height function z(x,y) that includes, for every point (x,y) of the specified solid, height/depth information, the imaged regions of the specified three dimensional solid being arranged via printing, embossing, disposing, or a combination thereof, on or in at least one of the security papers, value documents, or other non-transitory data carriers, (B) a viewing grid composed of a plurality of viewing elements for depicting the specified three dimensional solid when the motif image is viewed with the aid of the viewing grid, the motif image of the motif layer having an image function m(x,y) that is given by $$m(x, y) = f\begin{pmatrix} x_K \\ y_K \end{pmatrix} \cdot g(x, y),$$

where $$\begin{pmatrix} x_K \\ y_K \end{pmatrix} = \begin{pmatrix} x \\ y \end{pmatrix} + V(x, y) \cdot \left( \left( \left( \begin{pmatrix} x \\ y \end{pmatrix} + w_d(x, y) \right) \bmod W \right) - w_d(x, y) - w_c(x, y) \right),$$

$$w_d = (x, y) = W \cdot \begin{pmatrix} d_1(x, y) \\ d_2(x, y) \end{pmatrix} \text{ and } w_c(x, y) = W \cdot \begin{pmatrix} c_1(x, y) \\ c_2(x, y) \end{pmatrix},$$

such that the specified three dimensional solid is depicted when the motif image of the motif image is viewed through the viewing grid;

wherein a unit cell of the viewing grid is described by lattice cell vectors $$w_1 = \begin{pmatrix} w_{11} \\ w_{21} \end{pmatrix} \text{ and } w_2 = \begin{pmatrix} w_{12} \\ w_{22} \end{pmatrix}$$

and combined in the matrix $$W = \begin{pmatrix} w_{11} & w_{12} \\ w_{21} & w_{22} \end{pmatrix},$$

the magnification term V(x,y) is either a scalar $$V(x, y) = \left( \frac{z(x, y)}{e} - 1 \right),$$

where e is an effective distance of the viewing grid from the motif image, or a matrix V(x,y)=(A(x,y)−I), the matrix $$A(x, y) = \begin{pmatrix} a_{11}(x, y) & a_{12}(x, y) \\ a_{21}(x, y) & a_{22}(x, y) \end{pmatrix}$$

describing a desired magnification and movement behavior for the specified three dimensional solid and I being the identity matrix, the vector $(c_1(x,y), c_2(x,y))$, where $0 \le c_1(x, y), c_2(x, y) < 1$, indicates a position of a center of the viewing elements relative to the cells of the motif image, the vector $(d_1(x,y), d_2(x,y))$, where $0 \le d_1(x, y), d_2(x, y) < 1$, represents a displacement of cell boundaries in the motif image, and g(x,y) is a mask function for adjusting the visibility of the specified three dimensional solid.

22. The security element according to claim 21, characterized in that two height functions $z_1(x,y)$ and $z_2(x,y)$ and two angles $\phi_1(x, y)$ and $\phi_2(x, y)$ are specified, and in that the magnification term is given by a matrix V(x,y)=(A(x,y)−I), where $$A(x, y) = \begin{pmatrix} a_{11}(x, y) & a_{12}(x, y) \\ a_{21}(x, y) & a_{22}(x, y) \end{pmatrix} = \begin{pmatrix} \frac{z_1(x, y)}{e} & \frac{z_2(x, y)}{e} \cdot \cot\phi_2(x, y) \\ \frac{z_1(x, y)}{e} \cdot \tan\phi_1(x, y) & \frac{z_2(x, y)}{e} \end{pmatrix}.$$

23. The security element according to claim 21, characterized in that two height functions $z_1(x,y)$ and $z_2(x,y)$ are specified, and in that the magnification term is given by a matrix V(x,y)=(A(x,y)−I), where $$A(x, y) = \begin{pmatrix} \frac{z_1(x, y)}{e} & 0 \\ 0 & \frac{z_2(x, y)}{e} \end{pmatrix}.$$

24. The security element according to claim 21, characterized in that a height function z(x,y) and an angle $\phi_1$ are specified, and in that the magnification term is given by a matrix V(x,y)=(A(x,y)−I), where $$A(x,y)=\begin{pmatrix}\frac{z_1(x,y)}{e} & 0\\ \frac{z_1(x,y)}{e}\cdot\tan\phi_1 & 1\end{pmatrix}$$

such that the depicted three dimensional solid, upon viewing with an eye separation being in the x-direction and tilting the security element in the x-direction, moves in the direction $\phi_1$ to the x-axis, and upon tilting in the y-direction, no movement occurs.

25. The security element according to claim 24, characterized in that the viewing grid is a slot grid, cylindrical lens grid or cylindrical concave reflector grid whose unit cell is given by $$W=\begin{pmatrix}d & 0\\ 0 & \infty\end{pmatrix}$$

where d is the slot or cylinder axis distance.

26. The security element according to claim 21, characterized in that the height function z(x,y), an angle $\phi_1$ and a direction, by an angle $\gamma$, are specified, and in that the magnification term is given by a matrix V(x,y)=(A(x,y)−I), where $$A=\begin{pmatrix}\cos\gamma & -\sin\gamma\\ \sin\gamma & \cos\gamma\end{pmatrix}\cdot\begin{pmatrix}\frac{z_1(x,y)}{e} & 0\\ \frac{z_1(x,y)}{e}\cdot\tan\phi_1 & 1\end{pmatrix}\cdot\begin{pmatrix}\cos\gamma & \sin\gamma\\ -\sin\gamma & \cos\gamma\end{pmatrix}.$$

27. The security element according to claim 26, characterized in that the viewing grid is a slot grid, cylindrical lens grid or cylindrical concave reflector grid whose unit cell is given by $$W=\begin{pmatrix}\cos\gamma & -\sin\gamma\\ \sin\gamma & \cos\gamma\end{pmatrix}\cdot\begin{pmatrix}d & 0\\ 0 & \infty\end{pmatrix}$$

wherein d indicates the slot or cylinder axis distance and $\gamma$ the direction of the slot or cylinder axis.

28. The security element according to claim 21, characterized in that two height functions $z_1(x,y)$ and $z_2(x,y)$ and an angle $\phi_2$ are specified, and in that the magnification term is given by a matrix V(x,y)=(A(x,y)−I), where $$A(x,y)=\begin{pmatrix}0 & \frac{z_1(x,y)}{e}\cdot\cot\phi_2\\ \frac{z_1(x,y)}{e} & \frac{z_2(x,y)}{e}\end{pmatrix},$$

$$A(x,y)=\begin{pmatrix}0 & \frac{z_2(x,y)}{e}\\ \frac{z_1(x,y)}{e} & 0\end{pmatrix}\text{ if }\phi_2=0$$

such that the depicted three dimensional solid, upon viewing with an eye separation being in the x-direction and tilting the security element in the x-direction, moves normal to the x-axis, and upon viewing with the eye separation being in the y-direction and tilting the arrangement in the y-direction, the depicted three dimensional solid moves in the direction $\phi_2$ to the x-axis.

29. A security element for security papers, value documents, or other non-transitory data carriers, the security element comprising:

(A) a motif layer including a motif image that is subdivided into a plurality of cells, in each of which are arranged imaged regions of a specified three dimensional solid given by n sections $f_j(x,y)$ and n transparency step functions $t_j(x,y)$, where j=1, . . . n, wherein, upon viewing with the eye separation being in the x-direction, the sections each lie at a depth $z_j$, $z_j>z_{j-1}$, and wherein $f_j(x,y)$ is the image function of the j-th section, and the transparency step function $t_j(x,y)$ is equal to 1 if, at the position (x,y), the section j covers objects lying behind it, and otherwise is equal to 0, the imaged regions of the specified three dimensional solid being arranged via printing, embossing, disposing, or a combination thereof, on or in at least one of the security papers, value documents, or other non-transitory data carriers, (B) a viewing grid composed of a plurality of viewing elements for depicting the specified three dimensional solid when the motif image is viewed with the aid of the viewing grid, the motif image having an image function m(x,y) that is given by $$m(x,y)=f\begin{pmatrix}x_K\\ y_K\end{pmatrix}\cdot g(x,y),$$

where $$\begin{pmatrix}x_K\\ y_K\end{pmatrix}=\begin{pmatrix}x\\ y\end{pmatrix}+V_j\cdot\left(\left(\left(\begin{pmatrix}x\\ y\end{pmatrix}+w_d(x,y)\right)\bmod W\right)-w_d(x,y)-w_c(x,y)\right),$$

$$w_d=(x,y)=W\cdot\begin{pmatrix}d_1(x,y)\\ d_2(x,y)\end{pmatrix}\text{ and }w_c(x,y)=W\cdot\begin{pmatrix}c_1(x,y)\\ c_2(x,y)\end{pmatrix},$$

wherein, for j, the smallest or the largest index is to be taken for which $$t_j\begin{pmatrix}x_K\\ y_K\end{pmatrix}$$

is not equal to zero, such that the specified three dimensional solid is depicted when the motif image of the motif layer is viewed through the viewing grid;

and wherein a unit cell of the viewing grid is described by lattice cell vectors $$w_1=\begin{pmatrix}w_{11}\\ w_{21}\end{pmatrix}\text{ and }w_2=\begin{pmatrix}w_{12}\\ w_{22}\end{pmatrix}$$

and combined in the matrix $$W = \begin{pmatrix} w_{11} & w_{12} \\ w_{21} & w_{22} \end{pmatrix},$$

the magnification term $V_j$ is either a scalar $$V_j = \left(\frac{z_j}{e} - 1\right),$$

where e is an effective distance of the viewing grid from the motif image, or a matrix $V_j=(A_j-I)$, the matrix $$A_j = \begin{pmatrix} a_{j11} & a_{j12} \\ a_{j21} & a_{j22} \end{pmatrix}$$

describing a desired magnification and movement behavior for the specified three dimensional solid and I being the identity matrix, the vector $(c_1(x,y), c_2(x,y))$, where $0 \le c_1(x, y), c_2(x, y) < 1$, indicates a position of a center of the viewing elements relative to the cells of the motif image, the vector $(d_1(x,y), d_2(x,y))$, where $0 \le d_1(x, y), d_2(x, y) < 1$, represents a displacement of cell boundaries in the motif image, and g(x,y) is a mask function for adjusting the visibility of the specified three dimensional solid.

30. The security element according to claim 29, characterized in that a change factor k not equal to 0 is specified and the magnification term is given by a matrix $V_j=(A_j-I)$, where $$A_j = \begin{pmatrix} \frac{z_j}{e} & 0 \\ 0 & k \cdot \frac{z_j}{e} \end{pmatrix}$$

such that, upon rotating the security element, the depth impression of the depicted three dimensional solid changes by the change factor k.

31. The security element according to claim 29, characterized in that a change factor k not equal to 0 and two angles $\phi_1$ and $\phi_2$ are specified, and the magnification term is given by a matrix $V_j=(A_j-I)$, where $$A_j = \begin{pmatrix} \frac{z_j}{e} & k \cdot \frac{z_j}{e} \cdot \cot\phi_2 \\ \frac{z_j}{e} \cdot \tan\phi_1 & k \cdot \frac{z_j}{e} \end{pmatrix}$$

such that the depicted three dimensional solid, upon viewing with an eye separation being in the x-direction and tilting the security element in the x-direction, moves in the direction $\phi_1$ to the x-axis, and upon viewing with the eye separation being in the y-direction and tilting the security element in the y-direction, moves in the direction $\phi_2$ to the x-axis and is stretched by the change factor k in the depth dimension.

32. The security element according to claim 29, characterized in that an angle $\phi_1$ is specified, and in that the magnification term is given by a matrix $V_j=(A_j-I)$, where $$A_j = \begin{pmatrix} \frac{z_j}{e} & 0 \\ \frac{z_j}{e} \cdot \tan\phi_1 & 1 \end{pmatrix}$$

such that the depicted three dimensional solid, upon viewing with an eye separation being in the x-direction and tilting the security element in the x-direction, moves in the direction $\phi_1$ to the x-axis, and no movement occurs upon tilting in the y-direction.

33. The security element according to claim 32, characterized in that the viewing grid is a slot grid, cylindrical lens grid or cylindrical concave reflector grid whose unit cell is given by $$W = \begin{pmatrix} d & 0 \\ 0 & \infty \end{pmatrix}$$

where d is the slot or cylinder axis distance.

34. The security element according to claim 29, characterized in that an angle $\phi_1$ and a direction, by an angle $\gamma$, are specified and that the magnification term is given by a matrix $V_j=(A_j-I)$, where $$A_j = \begin{pmatrix} \cos\gamma & -\sin\gamma \\ \sin\gamma & \cos\gamma \end{pmatrix} \cdot \begin{pmatrix} \frac{z_j}{e} & 0 \\ \frac{z_j}{e} \cdot \tan\phi_1 & 1 \end{pmatrix} \cdot \begin{pmatrix} \cos\gamma & \sin\gamma \\ -\sin\gamma & \cos\gamma \end{pmatrix}.$$

35. The security element according to claim 34, characterized in that the viewing grid is a slot grid, cylindrical lens grid or cylindrical concave reflector grid whose unit cell is given by $$W = \begin{pmatrix} \cos\gamma & -\sin\gamma \\ \sin\gamma & \cos\gamma \end{pmatrix} \cdot \begin{pmatrix} d & 0 \\ 0 & \infty \end{pmatrix}$$

wherein d indicates the slot or cylinder axis distance and $\gamma$ the direction of the slot or cylinder axis.

36. The security element according to claim 29, characterized in that a change factor k not equal to 0 and an angle $\phi$ are specified, and in that the magnification term is given by a matrix $V_j(A_j-I)$, where $$A_j = \begin{pmatrix} 0 & k \cdot \frac{z_j}{e} \cdot \cot\phi \\ \frac{z_j}{e} & k \cdot \frac{z_j}{e} \end{pmatrix}, A_j = \begin{pmatrix} 0 & k \cdot \frac{z_j}{e} \\ \frac{z_j}{e} & 0 \end{pmatrix} \text{ if } \phi = 0$$

such that the depicted three dimensional solid, upon horizontal tilting of the security element, moves normal to the tilt direction, and upon vertical tilting of the security element, in the direction $\phi$ to the x-axis.

37. The security element according to claim 29, characterized in that a change factor k not equal to 0 and an angle $\phi_1$ are specified, and in that the magnification term is given by a matrix $V_j=(A_j-I)$, where $$A_j = \begin{pmatrix} \frac{z_j}{e} & k \cdot \frac{z_j}{e} \cdot \cot\phi_1 \\ \frac{z_j}{e} \cdot \tan\phi_1 & k \cdot \frac{z_j}{e} \end{pmatrix}$$

such that the depicted three dimensional solid always moves, independently of the tilt direction of the security element, in the direction $\phi_1$ to the x-axis.

38. A security element for security papers, value documents, or other non-transitory data carriers, the security element comprising:

(A) a motif layer including a motif image that is subdivided into a plurality of cells, in each of which are arranged imaged regions of a plurality of specified three dimensional solids given by solid functions $f_i(x,y,z)$, $i=1, 2, \ldots N$, where $N \geq 1$, the imaged regions of the specified three dimensional solids being arranged via printing, embossing, disposing, or a combination thereof, on or in at least one of the security papers, value documents, or other non-transitory data carriers, (B) a viewing grid composed of a plurality of viewing elements for depicting the specified three dimensional solids when the motif image is viewed with the aid of the viewing grid, the motif image having an image function $m(x,y)$ that is given by $m(x, y)=F(h_1, h_2, \ldots h_N)$, having the describing functions $$h_i(x, y) = f_i\begin{pmatrix} x_{iK} \\ y_{iK} \\ z_{iK}(x, y, x_m, y_m) \end{pmatrix} \cdot g_i(x, y),$$

where $$\begin{pmatrix} x_{iK} \\ y_{iK} \end{pmatrix} = \begin{pmatrix} x \\ y \end{pmatrix} + V_i(x, y, x_m, y_m) \cdot \left( \left( \left( \begin{pmatrix} x \\ y \end{pmatrix} + w_{di}(x, y) \right) \bmod W \right) - w_{di}(x, y) - w_{ci}(x, y) \right)$$

$$w_{di}(x, y) = W \cdot \begin{pmatrix} d_{i1}(x, y) \\ d_{i2}(x, y) \end{pmatrix} \text{ and } w_{ci}(x, y) = W \cdot \begin{pmatrix} c_{i1}(x, y) \\ c_{i2}(x, y) \end{pmatrix},$$

such that the specified three dimensional solids are depicted when the motif image of the motif layer is viewed through the viewing grid wherein $F(h_1, h_2, \ldots h_N)$ is a master function that indicates an operation on the N describing functions $h_i(x,y)$, and wherein a unit cell of the viewing grid is described by lattice cell vectors $$w_1 = \begin{pmatrix} w_{11} \\ w_{21} \end{pmatrix} \text{ and } w_2 = \begin{pmatrix} w_{12} \\ w_{22} \end{pmatrix}$$

and combined in the matrix $$W = \begin{pmatrix} w_{11} & w_{12} \\ w_{21} & w_{22} \end{pmatrix},$$

and $x_m$ and $y_m$ indicate the lattice points of the W-lattice, the magnification terms $V_i(x,y, x_m,y_m)$ are either scalars $$V_i(x, y, x_m, y_m) = \left( \frac{z_{iK}(x, y, x_m, y_m)}{e} - 1 \right),$$

where e is an effective distance of the viewing grid from the motif image, or matrices $V_i(x,y, x_m,y_m)$, $(A_i(x,y, x_m,y_m)-I)$, the matrices $$A_i(x, y, x_m, y_m) = \begin{pmatrix} a_{i11}(x, y, x_m, y_m) & a_{i12}(x, y, x_m, y_m) \\ a_{i21}(x, y, x_m, y_m) & a_{i22}(x, y, x_m, y_m) \end{pmatrix}$$

each describing a desired magnification and movement behavior for the specified three dimensional solid f, and I being the identity matrix, the vectors $(c_{i1}(x,y), c_{i2}(x,y))$, where $0 \leq c_{i1}(x, y), c_{i2}(x, y) < 1$, indicate in each case, for the specified three dimensional solid $f_i$, a position of a center of the viewing elements relative to the cells i of the motif image, the vectors $(d_{i1}(x,y), d_{i2}(x,y))$, where $0 \leq d_{i1}(x, y), d_{i2}(x, y) < 1$, each represent a displacement of cell boundaries in the motif image, and $g_i(x,y)$ are mask functions for adjusting the visibility of the specified three dimensional solid $f_i$.

39. The security element according to claim 38, characterized in that, in addition to the solid functions $f_i(x,y,z)$, transparency step functions $t_i(x,y,z)$ are given, wherein $t_i(x,y,z)$ is equal to 1 if, at the position (x,y,z), the specified three dimensional solid $f_i(x,y,z)$ covers the background, and otherwise is equal to 0, and wherein, for a viewing direction substantially in the direction of the z-axis, for $z_{iK}((x,y,x_m,y_m)$, the smallest value is to be taken for which $t_i(x,y,z_K)$ is not equal to zero in order to view a front of the specified three dimensional solid $f_i$ from the outside, and wherein, for a viewing direction substantially in the direction of the z-axis, for $z_{iK}((x,y,x_m,y_m)$, the largest value is to be taken for which $t_i(x,y,z_K)$ is not equal to zero in order to view a back of the specified three dimensional solid $f_i$ from the inside.

40. The security element according to claim 38 characterized in that at least one of the describing functions $h_i(x,y)$ or $h_{ij}(x,y)$ is designed according to an image function $m(x,y)$ that is given by $$m(x, y) - f\begin{pmatrix} x_K \\ y_K \\ z_K(x, y, x_m, y_m) \end{pmatrix} \cdot g(x, y), \text{ where}$$

$$\begin{pmatrix} x_K \\ y_K \end{pmatrix} = \begin{pmatrix} x \\ y \end{pmatrix} + V(x, y, x_m, y_m) \cdot \left( \left( \left( \begin{pmatrix} x \\ y \end{pmatrix} + w_d(x, y) \right) \bmod W \right) - w_d(x, y,) - w_c(x, y) \right)$$

$$w_d(x, y) = W \cdot \begin{pmatrix} d_1(x, y) \\ d_2(x, y) \end{pmatrix} \text{ and } w_c(x, y) = W \cdot \begin{pmatrix} c_1(x, y) \\ c_2(x, y) \end{pmatrix}.$$

41. The security element according to claim 38, characterized in that the security element depicts an alternating image, a motion image or a morph image.

42. The security element according to claim 38, characterized in that the mask functions $g_i$ and $g_{ij}$ define a strip-like or checkerboard-like alternation of the visibility of the solids $f_i$.

43. The security element according to claim 38, characterized in that the master function F constitutes the sum function.

44. The security element according to claim 38, characterized in that two or more of the specified three-dimensional solids $f_i$ are visible simultaneously.

45. A security element for security papers, value documents, or other non-transitory data carriers, the security element comprising:

(A) a motif layer including a motif image that is subdivided into a plurality of cells, in each of which are arranged imaged regions of a plurality of specified solids given by height profiles having two-dimensional depictions of the solids $f_i(x,y)$, i=1, 2, . . . N, where N≥1, and by height functions $z_i(x,y)$, each of which includes height/depth information for every point (x,y) of the specified three dimensional solid $f_i$, the imaged regions of the specified three dimensional solid being arranged via printing, embossing, disposing, or a combination thereof, on or in at least one of the security papers, value documents, or other non-transitory data carriers, (B) a viewing grid composed of a plurality of viewing elements for depicting the specified three dimensional solids when the motif image is viewed with the aid of the viewing grid, the motif image having an image function m(x,y) that is given by $m(x, y)=F(h_1, h_2, \ldots h_N)$, having the describing functions $$h_i(x, y) = f_i\begin{pmatrix} x_{iK} \\ y_{iK} \end{pmatrix} \cdot g_i(x, y), \text{ where}$$

$$\begin{pmatrix} x_{iK} \\ y_{iK} \end{pmatrix} = \begin{pmatrix} x \\ y \end{pmatrix} + V_i(x, y) \cdot \left( \left( \left( \begin{pmatrix} x \\ y \end{pmatrix} + w_{di}(x, y) \right) \bmod W \right) - w_{di}(x, y) - w_{ci}(x, y) \right)$$

$$w_{di}(x, y) = W \cdot \begin{pmatrix} d_{i1}(x, y) \\ d_{i2}(x, y) \end{pmatrix} \text{ and } w_{ci}(x, y) = W \cdot \begin{pmatrix} c_{i1}(x, y) \\ c_{i2}(x, y) \end{pmatrix},$$

such that the specified three dimensional solids are depicted when the motif image of the motif layer is viewed through the viewing grid;

wherein $F(h_1, h_2, \ldots h_N)$ is a master function that indicates an operation on the N describing functions $h_i(x,y)$, and wherein a unit cell of the viewing grid is described by lattice cell vectors $$w_1 = \begin{pmatrix} w_{11} \\ w_{21} \end{pmatrix} \text{ and } w_2 = \begin{pmatrix} w_{12} \\ w_{22} \end{pmatrix}$$

and combined in the matrix $$W = \begin{pmatrix} w_{11} & w_{12} \\ w_{21} & w_{22} \end{pmatrix},$$

the magnification terms $V_i(x,y)$ are either scalars $$V_i(x, y) = \left( \frac{z_i(x, y)}{e} - 1 \right),$$

where e is an effective distance of the viewing grid from the motif image, or matrices $V_i(x,y)=(Ai(x,y)-I)$, the matrices $$A_i(x, y) = \begin{pmatrix} a_{i11}(x, y) & a_{i12}(x, y) \\ a_{i21}(x, y) & a_{i22}(x, y) \end{pmatrix}$$

each describing a desired magnification and movement behavior for the specified three dimensional solid $f_i$ and I being the identity matrix, the vectors $(c_{i1}(x,y), c_{i2}(x,y))$, where $0 \le c_{i1}(x, y), c_{i2}(x, y) < 1$, indicate in each case, for the specified three dimensional solid $f_i$, a position of the center of the viewing elements relative to the cells i of the motif image, the vectors $(d_{i1}(x,y), d_{i2}(x,y))$, where $0 \le d_{i1}(x, y), d_{i2}(x, y) < 1$, each represent a displacement of cell boundaries in the motif image, and $g_i(x,y)$ are mask functions for adjusting the visibility of the specified three dimensional solid $f_i$.

46. A security element for security papers, value documents, or other non-transitory data carriers, the security element comprising:

(A) a motif layer including a motif image that is subdivided into a plurality of cells, in each of which are arranged imaged regions of a plurality of specified three dimensional solids each given by $n_i$ sections $f_{ij}(x,y)$ and n, transparency step functions $t_{ij}(x,y)$, where i=1, 2, . . . N and j=1, 2, . . . $n_i$, wherein, upon viewing with the eye separation being in the x-direction, the sections of the solid i each lie at a depth $z_{ij}$ and wherein $f_{ij}(x,y)$ is the image function of the j-th section of the i-th solid, and the transparency step function $t_{ij}(x,y)$ is equal to 1 if, at the position (x,y), the section j of the solid i covers objects lying behind it, and otherwise is equal to 0, the imaged regions of the specified three dimensional solids being arranged via printing, embossing, disposing, or combinations thereof, on at least one of the security papers, value documents, devices or other non-transitory data carriers, (B) a viewing grid composed of a plurality of viewing elements for depicting the specified three dimensional solids when the motif image is viewed with the aid of the viewing grid, the motif image having an image function m(x,y) that is given by $m(x, y)=F(h_{11}, h_{12}, \ldots, h_{1n_1}, h_{21}, h_{22}, \ldots, h_{2n_2}, \ldots, h_{N1}, h_{N2}, \ldots, h_{Nn_N})$, having the describing functions $$h_{ij} = f_{ij}\begin{pmatrix} x_{iK} \\ y_{iK} \end{pmatrix} \cdot g_{ij}(x, y), \text{ where}$$

$$\begin{pmatrix} x_{iK} \\ y_{iK} \end{pmatrix} = \begin{pmatrix} x \\ y \end{pmatrix} + V_{ij} \cdot \left( \left( \left( \begin{pmatrix} x \\ y \end{pmatrix} + w_{di}(x, y) \right) \bmod W \right) - w_{di}(x, y) - w_{ci}(x, y) \right)$$

$$w_{di}(x, y) = W \cdot \begin{pmatrix} d_{i1}(x, y) \\ d_{i2}(x, y) \end{pmatrix} \text{ and } w_{ci}(x, y) = W \cdot \begin{pmatrix} c_{i1}(x, y) \\ c_{i2}(x, y) \end{pmatrix},$$

wherein, for ij in each case, the index pair is to be taken for which $$t_{ij}\begin{pmatrix} x_{iK} \\ y_{iK} \end{pmatrix}$$

is not equal to zero and $z_{ij}$ is minimal or maximal, such that the specified three dimensional solids are depicted when the motif image of the motif layer is viewed through the viewing grid;

wherein $F(h_{11}, h_{12}, \ldots, h_{1n_1}, h_{21}, h_{22}, \ldots, h_{2n_2}, \ldots, h_{N1}, h_{N2}, \ldots, h_{Nn_N})$ is a master function that indicates an operation on the describing functions $h_{ij}(x,y)$, a unit cell of the viewing grid is described by lattice cell vectors $$w_1 = \begin{pmatrix} w_{11} \\ w_{21} \end{pmatrix} \text{ and } w_2 = \begin{pmatrix} w_{12} \\ w_{22} \end{pmatrix}$$

and combined in the matrix $$W = \begin{pmatrix} w_{11} & w_{12} \\ w_{21} & w_{22} \end{pmatrix},$$

the magnification terms $V_{ij}$ are either scalars $$V_{ij} = \left(\frac{z_{ij}}{e} - 1\right),$$

where e is an effective distance of the viewing grid from the motif image, or matrices $V_{ij}=(A_{ij}-I)$, the matrices $$A_{ij} = \begin{pmatrix} a_{ij11} & a_{ij12} \\ a_{ij21} & a_{ij22} \end{pmatrix}$$

each describing a desired magnification and movement behavior for the specified three dimensional solid f, and I being the identity matrix, the vectors $(c_{i1}(x,y), c_{i2}(x,y))$, where $0 \le c_{i1}(x, y), c_{i2}(x, y) < 1$, indicate in each case, for the specified three dimensional solid $f_i$, a position of a center of the viewing elements relative to the cells i of the motif image, the vectors $(d_{i1}(x,y), d_{i2}(x,y))$, where $0 \le d_{i1}(x, y), d_{i2}(x, y) < 1$, each represent a displacement of cell boundaries in the motif image, and $g_{ij}(x,y)$ are mask functions for adjusting the visibility of the specified three dimensional solid $f_i$.

* * * * *